United States Patent
Spence et al.

(10) Patent No.: US 7,519,512 B2
(45) Date of Patent: Apr. 14, 2009

(54) DYNAMIC BLIND SIGNAL SEPARATION

(75) Inventors: Geoffrey Spence, Malvern (GB); Ira James Clarke, Malvern (GB); John Graham McWhirter, Malvern (GB)

(73) Assignee: Qinetiq Limited (GB)

( * ) Notice: Subject to any disclaimer, the term of this patent is extended or adjusted under 35 U.S.C. 154(b) by 33 days.

(21) Appl. No.: 10/579,021

(22) PCT Filed: Nov. 9, 2004

(86) PCT No.: PCT/GB2004/004714

§ 371 (c)(1),
(2), (4) Date: May 11, 2006

(87) PCT Pub. No.: WO2005/052848

PCT Pub. Date: Jun. 9, 2005

(65) Prior Publication Data

US 2007/0088226 A1 Apr. 19, 2007

(30) Foreign Application Priority Data

Nov. 14, 2003 (GB) ................................. 0326539.4

(51) Int. Cl.
*H03F 1/26* (2006.01)
(52) U.S. Cl. ..................... 702/189; 455/63.1
(58) Field of Classification Search .............. 702/66, 702/189–191, 196, 197; 600/509, 511; 455/501, 455/504, 63.1; 708/109
See application file for complete search history.

(56) References Cited

U.S. PATENT DOCUMENTS

| | | | |
|---|---|---|---|
| 5,776,073 A | 7/1998 | Garfield et al. | |
| 5,959,966 A * | 9/1999 | Torkkola | 370/203 |
| 6,321,200 B1 | 11/2001 | Casey | |
| 6,751,498 B1 | 6/2004 | Greenberg et al. | |
| 2001/0044719 A1 * | 11/2001 | Casey | 704/245 |

FOREIGN PATENT DOCUMENTS

WO    WO 01/17109    3/2001

(Continued)

OTHER PUBLICATIONS

Eriksson, J. et al. "Characteristic-function-based Independent Component Analysis", Oct. 2003, Signal Processing, vol. 83, No. 10, pp. 2195-2208.*

(Continued)

*Primary Examiner*—Manuel L Barbee
(74) *Attorney, Agent, or Firm*—McDonnell Boehnen Hulbert & Berghoff LLP

(57) ABSTRACT

A method for dynamic blind signal separation generates initialisation information by processing an immediately preceding data window. This information is input at (21) and used at (22) to initialize orthogonality of data in an immediately following window. Initialised data are decorrelated at (23) with small update angles using a Jacobi technique. Steps (22) and (23) are collectively a second order stage of processing in statistical terms producing orthonormal signals. The orthonormal signals are initialized at (25) and then undergo separation at (27) by ICA with small angle updates using statistics higher than second order to produce separated signals. The method may be implemented in an acquisition phase to separate signals and among them identify desired signals, and a subsequent phase in which only the desired signals are separated. It may also be implemented by obtaining first results, and subsequently iteratively updating immediately preceding results using subsequent data snapshots to produce snapshot results for combing with immediately preceding results weighted to produce exponential fading.

33 Claims, 17 Drawing Sheets

FOREIGN PATENT DOCUMENTS

| WO | WO 01/27874 | 4/2001 |
|----|----|----|
| WO | WO 02/088907 | 11/2002 |
| WO | WO 03/028550 | 4/2003 |
| WO | WO 03/090127 | 10/2003 |

OTHER PUBLICATIONS

Markowitz et al. "Blind de-mixing real-time algorithm of piecewise time series mixture", IEEE, pp. 1033-1037 (Jul. 1999).

Cardoso et al., "Equivariant Adaptive Source Separation", IEEE, pp. 3017-3030 (Dec. 1996).

Cichocki, "Adaptative Blind Signal and Image Processing", Learning Algorithms and Applications, pp. 274-277, 291-292 (2002).

Everson et al., "Particle Filters for Non-Stationary ICA", Advances in Independent Component Analysis, pp. 28-41 ((2000).

Jafari et al., "A Combined Kalman Filter and Natural Gradient Algorithm Approach for Blind Separation of Binary Distributed Sources in Time-Varying Channels", IEEE, pp. 2769-2772 (2001).

Lathauwer et al. "Fetal Electrocardiogram Extraction by Blind Source Subspace Separation", IEEE, pp. 567-572 (May 2000).

Jourjine et al. "Blind Separation of Disjoint Orthogonal Signals; Demixing N Sources from 2 Mixtures", IEEE Conference on Acoustics, Speech and Signal Processing, pp. 2985-2988 (Jun. 2000).

* cited by examiner

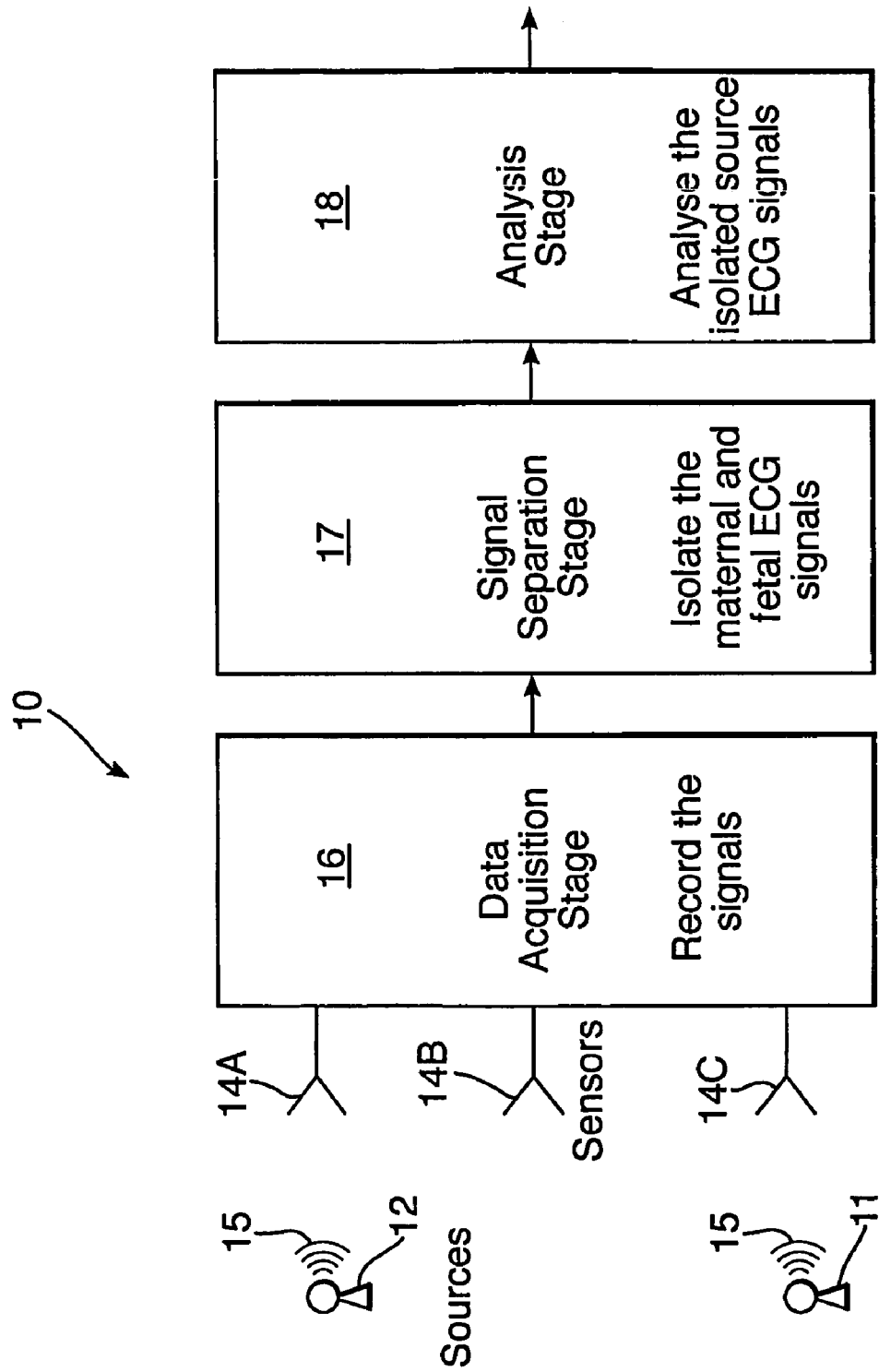

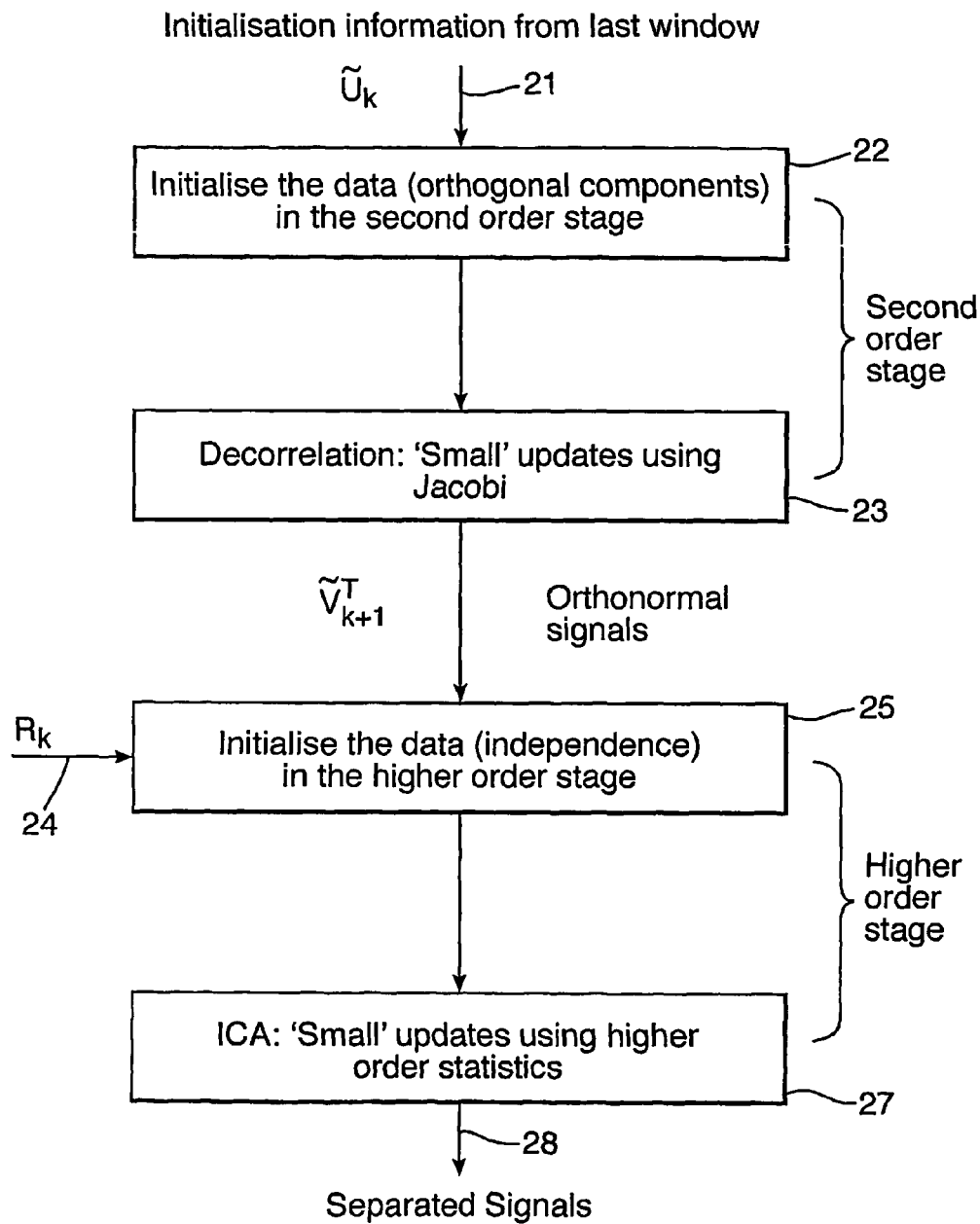

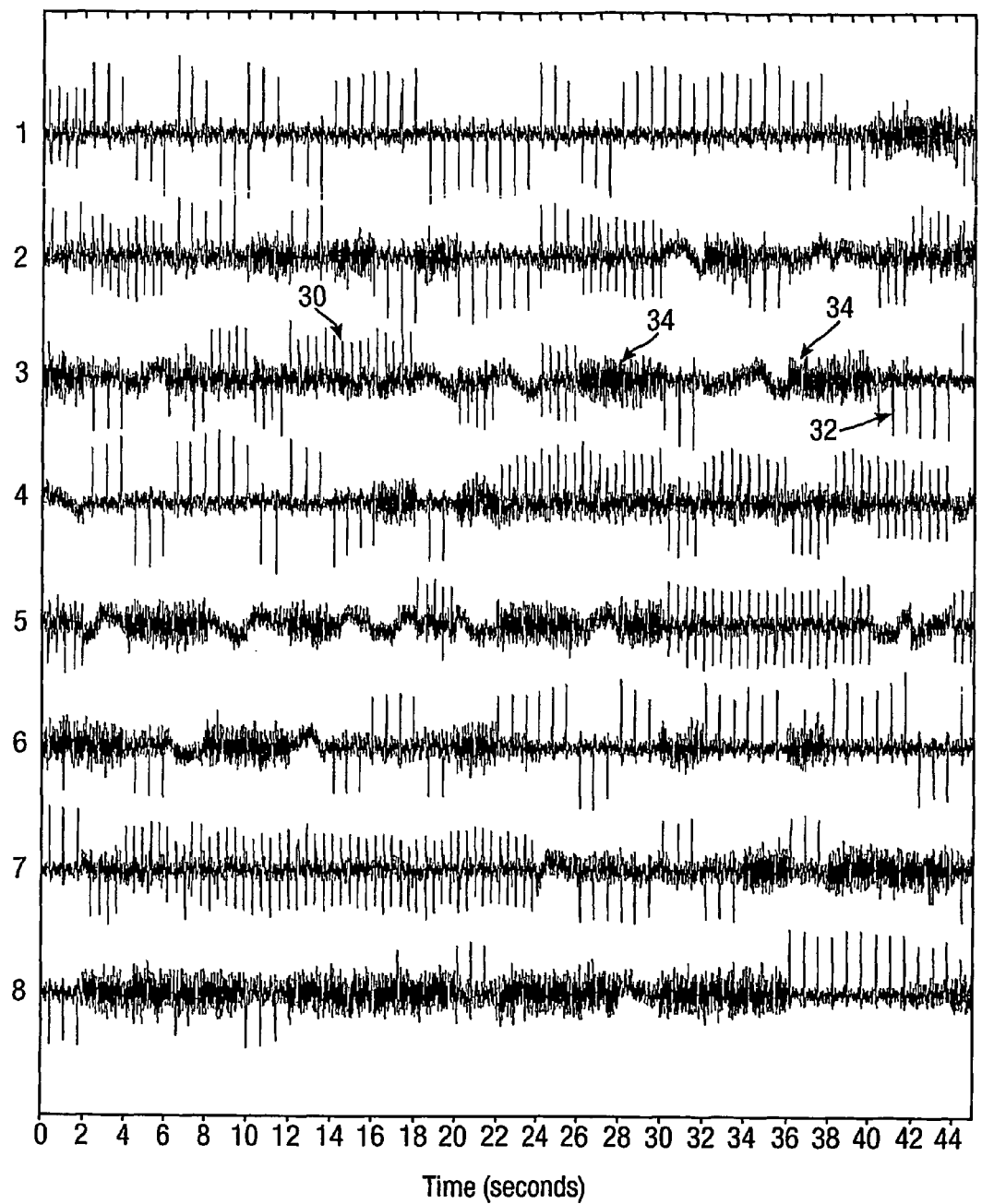

Small update process - second order stage

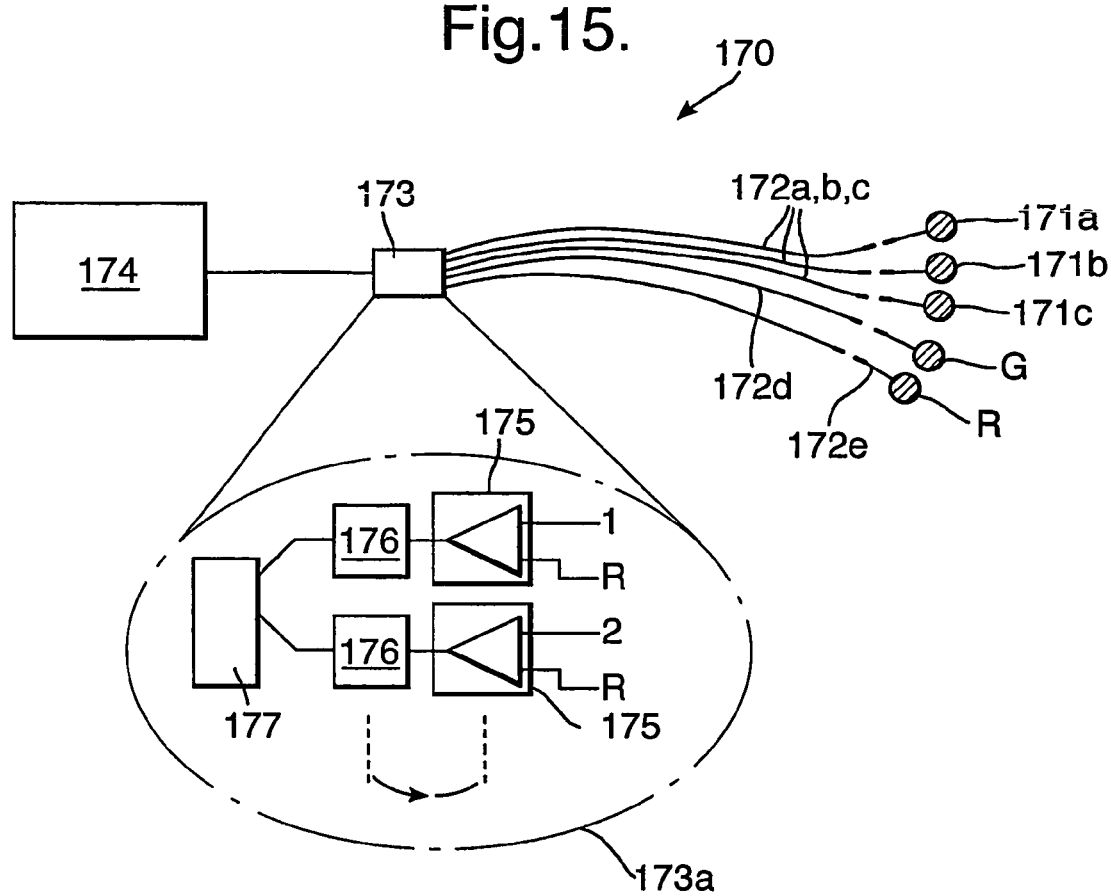

Time (seconds) ⟶

Time (seconds) ⟶

DYNAMIC BLIND SIGNAL SEPARATION

BACKGROUND OF THE INVENTION (1) Field of the Invention
(2) Description of the Art This invention relates to dynamic blind signal separation, that is to say blind signal separation which can be used inter alia in a non-stationary environment, and to a method, an apparatus and a computer program for implementing it.

SUMMARY OF THE INVENTION

In recent years, blind signal (or source) separation (BSS) has emerged as an important field in signal processing. It is now successfully exploited in applications such as biomedicine, financial analysis, speech recognition and telecommunications.

The objective of BSS is to recover or separate a number of statistically independent signals given only observations of mixtures of those sources detected using sensors, together with noise and unwanted interference. The term 'blind' is used to indicate that no prior information (e.g. waveform, frequency, bandwidth, location) is available concerning the individual sources or the manner in which they have been combined.

Although the term 'blind' is often associated with these techniques there are several assumptions that need to be satisfied such that signal separation can be achieved. The mixing conditions, i.e. the combination process of the signals at the sensors, must be linear and time-invariant. The term time-invariant means that the spatial statistics (combinations) of the signals received at the sensor array do not change with time. For this invention, another assumption for the combination process is that the signals arrive at the same time at the sensors. This is referred to as the instantaneous mixing case.

Many BSS methods have been developed for the problem when the combination (mixing) process is linear, instantaneous and time-invariant. These include:

The Blind Signal Separation (BLISS) algorithm developed by I. J. Clarke and published in: J. G. McWhirter, I. J. Clarke and G. Spence, "Multi-linear algebra for independent component analysis", SPIE's 44th Annual Meeting, The International Symposium on Optical Science, Engineering and Instrumentation, Denver USA, 18-23rd Jul., 1999.

The Joint Approximate Diagonalisation of Eigenmatrices (JADE) algorithm with a description found in J. F. Cardoso and A. Souloumiac, 'Blind beamforming for non-Gaussian signals', IEE proc-F, Vol. 140, no. 6, pp. 362-370, December 1993.

"An Improved Cumulant Based Method for Independent Component Analysis", T. Blaschke and L. Wiskott, Proc. Int. Conf. on Artificial Neural Networks, ICANN'02. 2002. This reference relates to use of third order statistics and is an alternative to BLISS. It is a block based technique like BLISS and JADE.

Published International Application No. WO 03/028550 A2 discloses a specific application of BLISS to monitoring fetal ECG signals using abdominal electrodes applied externally to a mother. Electrode signals are filtered and subjected to a BSS technique based on Independent Component Analysis (ICA), I. J. Clarke, "Direct Exploitation of non-Gaussianity as a Discriminant", EUSIPCO '98, Rhodes, Greece, 8-11 Sep., 1998.

Published International Patent Application No. WO 01/17109 discloses BSS by windowing data, applying a discrete Fourier Transform and cross-correlating the result. A gradient descent method is then used to define a finite impulse response filter which will separate mixed signals. U.S. Pat. No. 6,321,200 (Casey) discloses extraction of features from mixed signals by filterbank analysis, windowing resulting data to produce multidimensional observation matrices, reducing matrix dimensionality and processing by independent component analysis. Published International Patent Application No. WO 03/090127 discloses BSS using fourth-order cumulants. BSS of disjoint orthogonal signals is disclosed by A. Jourjine et al, Proc. 2000 IEEE Conference on Acoustics, Speech and Signal Processing, 2000 ICASSP'00, 5-9 Jun. 2000, Istanbul Turkey, Vol. 5, pp 2985-2988.

When non-stationary conditions apply, the accuracy with which some prior art BSS methods can detect and separate signals is restricted because it is normally not an objective of the prior art to deal with non-stationarity. This is because only a limited amount of data can be used reliably in the separation process, and statistically based estimates of the parameters may not be accurate. Additionally, processing of large data sets (e.g. over hours) is not possible. These limitations have led to the development of BSS methods for the non-stationary problem. Such methods include:

Particle filters for independent component analysis (ICA), R. M. Everson and S. J. Roberts, "Particle filters for non-stationary ICA", Advances in Independent Components Analysis, Eds. M Girolami, Sprinter, pp. 23-41, 2000.

The EASI (Equivariant Adaptive Source Separation) algorithm, J. F. Cardoso and B. Laheld, "Equivariant adaptive source separation", IEEE Trans. on Signal Processing., vol. 44, no 12, pp. 3017-3030, December 1996.

A Natural Gradient Algorithm (NGA) with Kalman filter approach, M. G. Jafari, H. W. Seah and J. A. Chambers, "A Combined Kalman Filter and Natural Gradient Algorithm Approach for Blind Separation of Binary Distributed Sources in Time-Varying Channels", IEEE conference on Acoustics, Speech and Signal Processing, Vol. 5, pp. 2769-2772, May 2001.

The Blind demixing algorithm, Z. Markowitz and H. Szu, "Blind Demixing Real-Time Algorithm of Piecewise Time Series", Internal Joint Conference on Neural Networks IJCNN'99, Vol. 2., pp. 1033-1037, 1999.

Particle filtering is a relatively new area of signal processing and it provides a robust method for tracking signals. However, its computational cost renders its use impractical for real time BSS.

In contrast to this, the EASI and NGA (with a Kalman filter) algorithms are much more computationally efficient. These techniques rely on stochastic and natural gradient approaches respectively. They tend to have slow convergence and in a non-stationary environment they are only suitable for tracking a slowly changing system.

Alternatively, a more robust technique uses the 'block' algorithms (such as BLISS and JADE described earlier) but in a moving window approach. The term window is used for a section or 'block' of data. It is assumed that the data window advances in time to cover all recorded data as a series of sections and the signals are separated at each window location. These block algorithms process blocks or windows of data in isolation from one another. They may be used in blind demixing, and they assume that:

each window of data contains enough information about the signal mixing process and reliable estimates of the signals can be obtained;

stationary mixing conditions apply locally, i.e. in each and neighbouring windows the mixing parameters will have a slow and smooth change.

A major problem with using a moving window approach is called 'signal swapping'. This arises from unmixed signals being in different orders in successive windows without the orders being discernible: i.e. a first window might be processed to separate six signals numbered 1 to 6 in the order 123456, and processing of the immediately following window might yield these signals in a different unknown order such as 413562. The resulting observed signals therefore contain parts assembled perhaps randomly from different source signals. It may not be convenient, practical or possible to reorder the signals correctly to allow continuous signal monitoring.

The blind demixing algorithm overcomes this problem by assuming prior knowledge of signal statistics to reorder signals. However in many applications signal statistics change from window to window and they may also be unknown.

Moreover, as in particle filtering, the computational cost of a moving window technique can render its use impractical for real time BSS processing.

It is an object of the invention to provide an alternative method of signal separation.

The present invention provides a method for dynamic blind signal separation including processing signals associated with windows of data characterised in that the method includes:

a) for pairs of successive windows, each pair having a leading window and a following window, processing the following window using results obtained in connection with each leading window to implement separate initialisation of orthogonality and independence of signals associated with the respective following window and obtain approximate results for the following window, and b) processing the approximate results to achieve signal separation.

The invention provides the advantage that it is normally capable of processing data faster than the prior art of block algorithms, because initialisation avoids the need to carry out a full analysis of each data window (other than the first such) and it results in computation being reduced. This is important in applications such as fetal heartbeat monitoring in particular, where processing in as near to real time as possible is desirable to enable clinical intervention in the case of an emergency. Moreover, as will be described later, separate initialisation of orthogonality and independence avoids a problem associated with two stage BSS, in which signals become normalised and consequently cannot be updated appropriately. The invention is applicable to monitoring systems changing sufficiently slowly with time such that leading window results are useable in processing of following windows.

Processing of the approximate results may incorporate updating orthogonality using small updates to produce decorrelation in a second order statistics procedure. Updating orthogonality may be implemented by a technique referred to as Jacobi and involving diagonalisation of a symmetric matrix by determining and applying rotations iteratively until off-diagonal elements of the matrix become substantially equal to zero.

The method may include a second stage of initialisation using results obtained for each leading window to initialise independence of decorrelated signals associated with the respective following window, this second stage using independent component analysis (ICA) to apply small rotation updates to initialised signals in a higher than second order statistics procedure to produce signal independence and separation. The higher than second order statistics procedure may be at least one of a third order and a fourth order statistics procedure.

The method may be implemented in an acquisition phase in which signals are separated and desired signals are identified among the separated signals, and in a subsequent phase in which only desired signals are processed to separation.

The signals associated with windows may be statistical measures of data in the windows.

The method may comprise an acquisition stage of processing a first leading window of data to obtain first results, and a subsequent stage of processing following windows by iteratively updating immediately preceding results using subsequent data snapshots to produce snapshot results and combining the snapshot results with the immediately preceding results, the immediately preceding results being those obtained in a respective immediately preceding update if any and being the first results otherwise. Prior to combining the snapshot results with the immediately preceding results, the immediately preceding results may be weighted with a forget factor to implement an exponentially fading following window.

The first results may comprise a mean vector of signal samples and a covariance matrix of a data matrix of the first leading window in each case, and decorrelation and normalisation of the data matrix to obtain signal vectors from which to obtain their moment as a fourth order tensor.

The snapshot results may comprise a mean snapshot vector and a snapshot covariance matrix, a decorrelated and normalised snapshot equivalent providing signal vectors from which to obtain their moment as a fourth order tensor update, and prior to combining the snapshot results with the immediately preceding results, the snapshot results may be weighted by a forget factor p and the immediately preceding results may be weighted by a further forget factor $(1-p)$ to produce an exponentially fading window, where $0<p<1$.

In another aspect, the present invention provides computer apparatus for dynamic blind signal separation programmed to process signals associated with windows of data characterised in that the computer apparatus is also programmed to:

a) process pairs of successive windows, each pair having a leading window and a following window, b) use results obtained in connection with each leading window to implement separate initialisation of orthogonality and independence of signals associated with the respective following window and obtain approximate results for the following window, and c) processing the approximate results to achieve signal separation.

The computer apparatus may be programmed to update orthogonality of the approximate results using small updates to produce decorrelation in a second order statistics procedure. It may be programmed to update orthogonality by a technique referred to as Jacobi and involving diagonalisation of a symmetric matrix by determining and applying rotations iteratively until off-diagonal elements of the matrix become substantially equal to zero.

The computer apparatus may be programmed to implement a second stage of initialisation using results obtained for each leading window to initialise independence of decorrelated data associated with the respective following window, this second stage involving ICA to apply small rotation updates to Initialised data in a higher than second order statistics procedure to produce signal independence and separation. The higher than second order statistics procedure may be at least one of a third order and a fourth order statistics procedure.

The computer apparatus may be programmed to implement an acquisition phase in which signals are separated and desired signals are identified among the separated signals, and a subsequent phase in which only desired signals are processed to separation.

The signals associated with windows may be statistical measures of data in the windows.

The computer apparatus may be programmed to implement an acquisition stage of processing a first leading window of data to obtain first results, and a subsequent stage of processing following windows by iteratively updating immediately preceding results using subsequent data snapshots to produce snapshot results and combining the snapshot results with the immediately preceding results, the immediately preceding results being those obtained in a respective immediately preceding update if any and being the first results otherwise. It may be programmed to implement an exponentially fading following window by weighting the immediately preceding results with a forget factor prior to combining the snapshot results with the immediately preceding results. The first results may comprise a mean vector of signal samples and a covadance matrix of a data matrix of the first leading window in each case, and decorrelation and normalisation of the data matrix to obtain signal vectors from which to obtain their moment as a fourth order tensor.

The snapshot results may comprise a mean snapshot vector and a snapshot covariance matrix, and the computer apparatus may be programmed to produce a decorrelated and normalised snapshot equivalent and to obtain therefrom signal vectors and their moment as a fourth order tensor update, to weight the snapshot results by a forget factor p and the immediately preceding results by a further forget factor (1−p) to implement an exponentially fading window, where 0<p<1, and to implement such weighting prior to combining the snapshot results with the immediately preceding results.

In a further aspect, the invention provides computer software for dynamic blind signal separation including processing signals associated with windows of data characterised in that the software has instructions for controlling computer apparatus to:
  a) process pairs of successive windows, each pair having a leading window and a following window,
  b) use results obtained in connection with each leading window to implement separate initialisation of orthogonality and independence of signals associated with the respective following window and obtain approximate results for the following window, and
  c) processing the approximate results to achieve signal separation.

The computer software may include instructions for processing the approximate results using small updates to update orthogonality and produce decorrelation in a second order statistics procedure. It may include instructions for updating orthogonality by a technique referred to as Jacobi and involving diagonalisation of a symmetric matrix by determining and applying rotations iteratively until off-diagonal elements of the matrix become substantially equal to zero.

The computer software may include instructions for implementing a second stage of initialisation using results obtained for each leading window to initialise independence of decorrelated data associated with the respective following window, this second stage using ICA to apply small rotation updates to initialised data in a higher than second order statistics procedure to produce signal independence and separation. The higher than second order statistics procedure may be at least one of a third order and a fourth order statistics procedure.

The computer software may include instructions for implementing an acquisition phase in which signals are separated and desired signals are identified among the separated signals, and a subsequent phase in which only desired signals are processed to separation.

The signals associated with windows may be statistical measures of data in the windows.

The computer software may include instructions for implementing an acquisition stage of processing a first leading window of data to obtain first results, and a subsequent stage of processing following windows by iteratively updating immediately preceding results using subsequent data snapshots to produce snapshot results and combining the snapshot results with the immediately preceding results, the immediately preceding results being those obtained in a respective immediately preceding update if any and being the first results otherwise. It may include instructions for implementing an exponentially fading following window by weighting the immediately preceding results with a forget factor prior to combining the snapshot results with the immediately preceding results.

The first results may comprise a mean vector of-signal samples and a covariance matrix of a data matrix of the first leading window in each case, and decorrelation and normalisation of the data matrix to obtain signal vectors from which to obtain their moment as a fourth order tensor. The snapshot results may comprise a mean snapshot vector and a snapshot covariance matrix, and the computer software may include instructions for producing a decorrelated and normalised snapshot equivalent and for obtaining therefrom signal vectors and their moment as a fourth order tensor update, and for weighting the snapshot results by a forget factor p and the immediately preceding results by a further forget factor (1−p) to implement an exponentially fading window, where 0<p<1, such weighting being prior to combining the snapshot results with the immediately preceding results.

DESCRIPTION OF THE FIGURES

In order that the invention might be more fully understood, an embodiment thereof will now be described, with reference to the accompanying diagrams, in which:

FIG. 1 is a schematic block diagram illustrating the method of the invention;

FIG. 3 is a block diagram illustrating the method of the invention;

FIG. 4 illustrates signal swapping in fetal ECG analysis;

FIG. 15 schematically shows electrode apparatus suitable for implementing fetal ECG monitoring;

DETAILED DESCRIPTION OF THE INVENTION

Figure 2A:
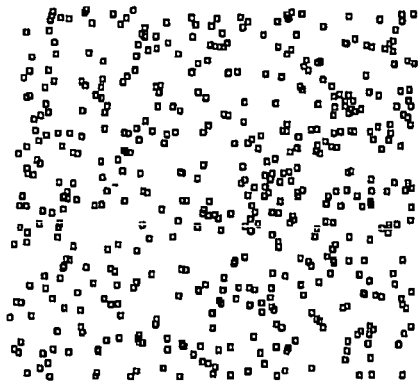
FIG. 2 shows signal scatter plots indicating stages in signal separation.
Figure 2B:
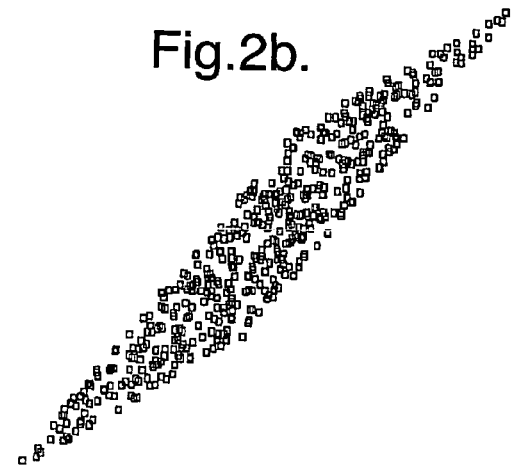
Figure 2C:
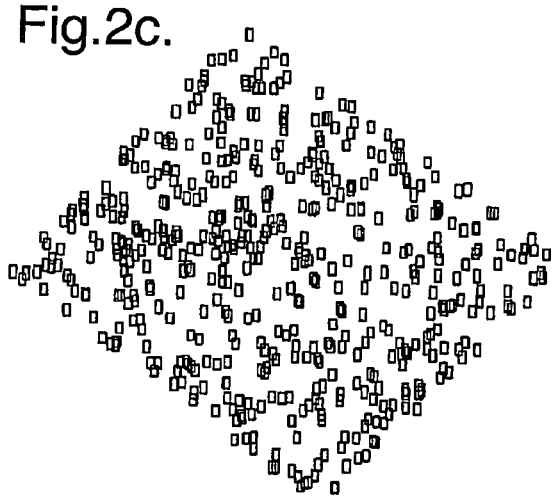
Figure 2D:
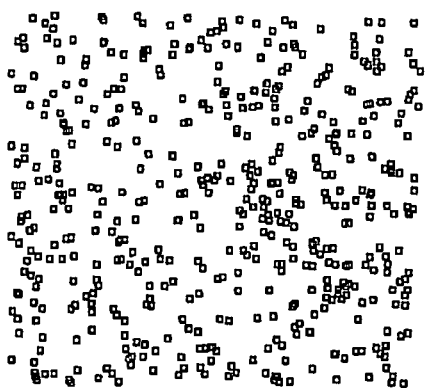

Referring to FIG. 1, a dynamic blind signal separation (BSS) system 10 of the invention is arranged to monitor signals from two sources 11 and 12. As illustrated, the system 10 has three sensors 14A, 14B and 14C (collectively 14) which develop electrical signals in response to reception of output signals 15 from both sources 11 and 12, although in actual applications of the invention more sensors may be used. One important application of the invention is monitoring fetal electrocardiogram (fetal ECG) non-invasively: this uses sensors in the form of external electrodes applied to the abdomen of a pregnant mother. It is described in International Patent Application No. WO 03/028550 (hereinafter "W550"), in which up to twelve signal electrodes are described defining respective signal channels in addition to ground and reference electrodes. It will be used as the basis for the present embodiment, which is concerned with the separation of a single fetal ECG signal for a singleton pregnancy, or multiple fetal signals for twins, triplets etc.

The sensors 14 supply input signals to a data acquisition stage 16 of the system 10 in which the Input signals are sampled in sets at a rate of approximately 500 sets of samples/second. The samples are then digitised and recorded. Each set of samples consists of a respective sample from each sensor 14, and the samples in each set are recorded substantially simultaneously. After recordal, these signals pass to a signal separation stage 17 where they are processed to yield separated or unmixed signals corresponding to source signals 15. The separated signals pass to an analysis stage 18, where they are analysed to distinguish fetal ECG signal, maternal ECG signal and noise.

The structure of signals recorded in fetal ECG monitoring are complex, as the required fetal ECG signal is subject to interference signals such as the much stronger maternal ECG signal and muscle noise. Typical prior art BSS methods are restricted to a relatively short section or time window of data over which prior art BSS assumptions hold good. There is however a well known and long felt want for signals to be separated and monitored over relatively longer periods of time, for which comparable prior art methods are not adequate.

Data from the acquisition stage 16 is processed as a series of what are referred to as data "windows" consisting of digital signals derived by digitising signals from each sensor 14, a typical signal may consist of 2,000-3,000 signal samples. Each window may partially overlap its preceding window, i.e. sets of samples may be common to both as described later. It is assumed that the data window advances through a succession of window locations in a block of data, signals are separated for each window location and eventually the entire data block is processed. A first data window is processed in the signal separation stage 17 by a block mode method such as BLISS or JADE. Before describing this in more detail, a signal model for each window will be established and BSS used therewith.

In fetal ECG analysis, the number of signal samples per set is normally taken to be equal to the number of signal electrodes, i.e. ignoring ground or reference electrodes.

For BSS, an appropriate (noise-free) data model for data window number k having m digital signals from respective signal electrodes, each signal with n samples, is given by:

$$X_k = A_k S_k \quad (1)$$

where: $X_k$ is an (m×n) matrix of data in window number k, and has rows which are respective signals (each expressed as a set of m data samples); $S_k$ is an (m×n) data matrix of similar kind to $X_k$ but representing unmixed signals, i.e. signals which have been separated and corresponding to independent source signals 15; and $A_k$ is an (m×m) mixing matrix which represents a transformation by which the source signals 15 are combined to form mixed signals received by electrodes and corresponding to $X_k$. The mixing model in each window expressed by Equation (1) is assumed to be linear, instantaneous and time-invariant. Data in each window is assumed to have a zero mean (or indeed the data is transformed to zero mean by subtracting its mean from each data sample), as this is convenient and does not affect the required result.

The signal separation problem to be solved in BSS is to recover or unmix signals (up to a permutation) represented by the data matrix $S_k$: this can be done by determining an inverse mixing matrix $A_k^{-1}$, the inverse of $A_k$, and premultiplying both sides of Equation (1) by it, i.e.:

$$A_k^{-1} X_k = A_k^{-1} A_k S_k = S_k \quad (2)$$

Equation (2) for the kth data window can be written for the immediately following or (k+1)th window as:

$$A_{k+1}^{-1} X_{k+1} = S_{k+1} \quad (3)$$

To determine the inverse mixing matrix $A_k^{-1}$, a BSS algorithm may use two stages. The first stage, which only uses second order statistics, is to decorrelate and normalise the signals. The second stage, which normally relies on fourth order statistics, makes the decorrelated and normalised signals (obtained from the first stage) independent.

In order for these two processes to be carried out efficiency and effectively in each window, the tracking method has several important features. The first two features include initialisation and update processes.

The expression "initialisation" means that information about a mixing matrix for an immediately preceding data window is used to initialise signals from a current window. This initialisation has the effect of rendering initialised signals nearly separated, so that a complete computation to unmix signals is not required. Although in this example the signals themselves are initialised, it is not in fact essential to do so: it is also possible to initialise intermediate quantities instead, i.e. parameters derived from data instead, e.g. the data's statistical measures such as its covariance matrix (as will be described later). To determine the mixing matrix of the current window, initialised signals will only require updating by a smaller amount than would be the case without initialisation. Moreover, as will be described later in more detail, initialisation in combination with small updates can prevent the problem of signal swapping.

It has been considered that the signals in the current window could be initialised using $A_k^{-1}$, such that a first approximation $S'_{k+1}$ to $S_{k+1}$ is provided by multiplying $X_{k+1}$ by $A_k^{-1}$ instead of $A_{k+1}^{-1}$, i.e.:

$$A_k^{-1} X_{k+1} = S'_{k+1} \quad (4)$$

The estimated $S'_{k+1}$ provided by Equation (4) will be closer to the desired value of $S_{k+1}$ than $X_{k+1}$. However, in the two stage BSS approach (mentioned above), estimated signals are normalised to have the same power. This has a consequence that, in a first stage (decorrelation), signals cannot be updated. This will be shown later. Even if the normalisation process were to be 'undone', updating the decorrelation process would then undo the effect of the previous stage. A feature of the example of the invention to be described is that it avoids this problem by updating the corresponding second and higher order components of the demixing matrix separately.

In the present example, an initialisation process is implemented in two stages as will be described in more detail later: in the first of these stages, the orthogonality of the signals is initialised and then the signals' orthogonality is updated using a decorrelation method.

This makes the signals orthogonal. Then, in the second stage, the independence of the signals is initialised and the signals' independence is updated using a higher order statistics stage. This makes the signals independent.

In the first of the stages referred to above, one option is to carry out a decorrelation and normalising method on the (m×n) matrix $X_k$. This may be referred to as a singular value decomposition (SVD) when the singular values are arranged in decreasing magnitude order (M. Moonen and B. De Moor, "SVD and Signal Processing, III Algorithms, Architectures and Applications", ASIN: 0444821074, Elsevier 1995). However, ordering of signals in this manner gives difficulty, because signal powers can change from window to window resulting in signal reordering. Hence signal swapping can occur, i.e. the process generates apparent signals which are actually segments of different signals joined together. The terminology of decorrelation and normalisation is preferred here to SVD, as signals are not ordered according to their power.

A second order decomposition of the data matrix $X_k$ can be expressed as:

$$X_k = U_k \Sigma_k V_k^T \quad (5)$$

where $U_k$ is an (m×m) unitary matrix containing eigenvectors of the data matrix's covariance matrix $X_k X_k^T$; $V_k$ is an (n×n) unitary matrix containing eigenvectors of $X_k^T X_k$; superscript index T in $X_k^T$ or $V_k^T$ denotes a transpose of matrix $X_k$ or $V_k$: and $\Sigma_k$ denotes an (m×n) diagonal matrix having singular values (square roots of eigenvalues) on its diagonal and zero values in all off-diagonal positions. These singular values are not necessarily arranged in order of decreasing magnitude and they indicate the relative contributions of associated eigenvectors to data to which both correspond.

The columns of $U_k$ are respective orthonormal singular vectors: they are spatial vectors indicating mixing of the source signals 15. The rows of $V_k^T$ are orthonormal singular vectors which are estimates of the source signals 15, but in general these estimates are not fully separated versions of source signals because they require a further relative rotation to become so. Decorrelation fails to separate the source signals fully because it is a second order decorrelation by which decomposed vectors are made mutually orthogonal, i.e. uncorrelated with one another. In many applications of the invention, the spatial characteristics (locations) of the signals will be similar, and so a solution that makes them dissimilar will not succeed in separating them.

This failure to separate signals is illustrated in FIG. 2, which is of the kind referred to as a "scatter plot". In this drawing a first signal is plotted on a vertical axis against a second signal on a horizontal axis in four plots (a) to (d). Points on the plots are indicated by squares and rectangles and represent values of the two signals at respective time instants (sample times). The plots (a) to (d) illustrate signals in various stages of mixing and unmixing. Plot (a) is a scatter plot of two source signals 15, which are assumed (for convenience of description) to be random uniformly distributed signals.

Plot (b) is a scatter plot of two signals which are mixtures of the source signals, i.e. after mixing but before processing to unmix them. It shows that the mixing process corresponds to a complicated combination of stretching, shearing and rotation. Plot (c) is a scatter plot of two signals derived by decorrelation and normalisation of the plot (b) signals. Such decorrelation and normalisation of signals is obtainable by application of a processing method which in statistical terms is restricted to second order: this method provides estimated signals from which stretching and shearing have been removed. However, comparison of plots (a) and (c) shows that estimated signals in (c) are rotated relative to (a): i.e. the second order method has failed to remove a rotation. The estimated signals are therefore related to the source signals 15 by an unknown rotation matrix, and it is necessary to determine this matrix to rotate the estimated signals in plot (c) to obtain appropriately separated signals. Plot (d) shows two signals obtained by rotating those in plot (c). Processing which produces only a rotation does not produce shearing or stretching, and thus does not counteract results achieved by the second order method. The rotation is chosen to align edges of scatter plot (d) with co-ordinate axes (not shown). The correct rotation is determined as will now be described using higher order statistics, where "higher order" means higher than second order.

In signal separation, determination of the unknown rotation matrix may satisfy a statistical independence condition. Mathematically, statistical independence of m signals $X_1$ to $X_m$ can be expressed as an ability to factorise the signals' joint probability function $p(x_1 \ldots x_m)$ into a product of the signals' joint probability functions $p(x_i)$, i.e.:

$$p(x_1 \ldots x_m) = \prod_{i=1}^{m} p(x_i) \quad (6)$$

This process uses higher order statistics (HOS). The use of HOS to separate unknown and independent signals is often referred to as independent component analysis (ICA, which normally involves second and higher order statistics), and this is the second stage in the separation process in this example.

From Equation (5), and only using data with non-zero singular values, $X_k$ can be expressed as $\tilde{U}_k \tilde{\Sigma}_k \tilde{V}_k^T$, where $\tilde{U}_k$ is an (m×m) matrix consisting of the first m columns of $U_k$; $\tilde{V}_k^T$ is an (m×n) matrix consisting of the first m rows of $V_k^T$; and $\tilde{\Sigma}_k$ is an (m×m) matrix containing the singular values of the kth window data matrix $X_k$. From FIGS. 2(c) and 2(d), the signal vectors in $\tilde{V}_k^T$ are related to the source signals 15 by a rotation. Hence applying an (m×m) unitary rotation matrix $R_k$ to $\tilde{V}_k^T$ will generate estimates of the unmixed or separated source signals 15: however, this will alter unacceptably the results obtained earlier by decorrelation and normalisation unless an equal and opposite (m×m) counter-rotation matrix $R_k^T$ is also introduced at the same time such that $R_k^T R_k = I$, the identity matrix. $R_k^T$ is applied to $\tilde{U}_k \tilde{\Sigma}_k$. This gives the following expression for $X_k$:

$$X_k = \tilde{U}_k \tilde{\Sigma}_k R_k^T R_k \tilde{V}_k^T \quad (7)$$

In Equation (7), the product $\tilde{U}_k \tilde{\Sigma}_k R_k^T$ is an estimate of the mixing matrix $A_k$ and the product $R_k \tilde{V}_k^T$ is a matrix having rows which are respective estimated signals. The estimated signals in $R_k \tilde{V}_k^T$ are orthonormal, i.e. orthogonal and normalised to have the same power, but have relative powers stored in the estimated mixing matrix $A_k$. This normalisation aspect is inherent in the second order stage approach to the blind signal separation process.

$R_k$ is calculated (as will be described later) by using an iterative sequence of pairwise rotations, each of which is designed to maximise the statistical independence of a respective pair of signals (taken from $\tilde{V}_k^T$) as measured by a corresponding pairwise cost function. In this maximisation process, the BLISS and JADE algorithms use fourth order statistics for the higher order statistics stage. In the present embodiment, the BLISS higher order statistics stage is used.

For each window, the main objective is to calculate parameters contained in Equation (7). If each window were to be processed in isolation as in the prior art, then results for each window would be determined separately: the computational cost of using k windows would then be k times that for a single window. This is impractical if the number of windows is large, e.g. >20 windows with 2,500 samples per signal per window. However, as previously described it has been found that it is possible to reduce the processing required by using results obtained for each window in initialisation of the separation process for a subsequent window. This initialisation converts data into an intermediate form which is closer to the desired result and reduces processing. It results in signals which are closer to being separated and a full computation of signal statistics is not required. The mixing matrix $A_k$ need not be stationary to permit this, but should be changing relatively slowly with time for the purposes of this invention.

Having discussed the BSS problem, it can now be shown that initialising signals with $A_k$ is not feasible. For example, rewriting Equation (7) by substituting index (k+1) for k, multiplying both sides by $(\tilde{U}_k \tilde{\Sigma}_k R_k^T)^{-1}$, the inverse of the estimated mixing matrix $A_k$ for the kth window, and replacing inverses of matrices by transposes:

$$(\tilde{U}_k \tilde{\Sigma}_k R_k^T)^{-1} X_{k+1} = (R_k \tilde{\Sigma}_k^{-1} \tilde{U}_k^T) X_{k+1} = (R_k \tilde{\Sigma}_k^{-1} \tilde{U}_k^T)(\tilde{U}_{k+1} \tilde{\Sigma}_{k+1} R_{k+1}^T R_{k+1} \tilde{V}_{k+1}^T) \quad (8)$$

In Equation (8), $(\tilde{U}_{k+1} \tilde{\Sigma}_{k+1} R_{k+1}^T R_{k+1} \tilde{V}_{k+1}^T)$ is unknown and has to be estimated from the data. $\tilde{U}_k$ and $R_k$ are unitary matrices, and therefore $\tilde{U}_k^{-1} = \tilde{U}_k^T$, $\tilde{U}_k^T \tilde{U}_k = I$ and $\tilde{U}_k \tilde{U}_k^T = I$, where I denotes the identity matrix. If $A_k$ is slowly changing, then $\tilde{U}_k^T \tilde{U}_{k+1} \approx I$, $R_k R_{k+1}^T \approx I$ and $\tilde{\Sigma}_k^{-1} \tilde{\Sigma}_{k+1} \approx I$. Using these three approximations:

$$(\tilde{U}_k \tilde{\Sigma}_k R_k^T)^{-1} X_{k+1} \approx R_{k+1} \tilde{V}_{k+1}^T \quad (9)$$

On the right of Approximation (9), the product $R_{k+1} \tilde{V}_{k+1}^T$ is a matrix having rows which are respective estimated signals: these signals are initialised and close to being orthonormal, i.e. to orthogonality and equality of signal powers, and can be processed by moving window ICA using a decorrelation method. However, they were obtained using a decorrelation and normalisation method in Equation (5), and this discriminates between unnormalised signals on the basis of signal power. Such discrimination makes Equation (5)'s decorrelation process much more difficult. A data window initialisation process is preferred (as will be described) which initialises the orthogonality of the incoming signals, i.e. those in the (k+1)th data window, but which avoids normalisation of these signals.

The present example is implemented in two separate stages, each involving a respective initialisation process: in the first of these stages, the orthogonality of the signals is initialised by applying the kth window matrix $\tilde{U}_k$ to them, and then their orthogonality is updated to reflect data in the (k+1)th window using a decorrelation method. This makes the signals orthogonal. Then, in the second stage, the independence of the signals is initialised by applying the kth window rotation matrix $R_k$ to them, and then their independence is updated using higher order statistics. This makes the signals independent.

FIG. 3 is a block diagram of signal separation in the present example. It summarises this example, and to relate it to theoretical analysis, reference will be made to equations to be provided later. Processing of the kth data window yields initialisation information in the form of matrices $\tilde{U}_k$ and $R_k$. The matrix $\tilde{U}_k$ is input at 21 and used at 22 to initialise orthogonality of data in an immediately following (k+1th) window using Equation (16). Initialised data are decorrelated at 23 using Equation (18) with small update angles, where "small" means more than one possibility is available and the smaller or smallest angle is chosen: step 23 uses a technique referred to as "Jacobi" and described in Adaptive Filter Theory (3rd Edition), S. Haykin, 1996. The expression "update" is employed because it reflects the fact that step 23 adjusts the results obtained at step 22 so that they are updated from partial reliance on the kth data window to become more fully reliant on the subsequent (k+1)th data window. Jacobi involves diagonalising a covariance matrix of the data matrix $X_{k+1}$ for the (k+1)th window, the covariance matrix being a symmetric matrix. Steps 22 and 23 collectively form a second order stage of processing in statistical terms producing orthonormal (orthogonal and normalised) signals.

The matrix $R_k$ is input at 24 and applied to the orthonormal signals at 25 to initialise them using Equation (26). The initialised orthonormal signals then undergo separation by rotation at 27 by ICA with small angle updates using higher order statistics and Equation (29). Here again, "small" means more than one possible updating angle is available and the smaller/smallest angle is chosen. Steps 25 and 27 are collectively a higher order stage of processing in statistical terms producing separated signals at an output 28.

In many decorrelation routines, signals are made orthonormal by using an iterative sequence of pairwise rotations. Each of these rotations is designed to maximise the orthogonality of a given pair of signals as measured by a corresponding pairwise (second order) cost function. In the Jacobi method, this can be accomplished by reducing a symmetric matrix to diagonal form using Given's rotation as described in the Haykin reference mentioned above. For example, in a two signal case the objective of using the Jacobi method is to diagonalise a (2×2) covariance matrix $X_{12}$ of two signals $x_1$ and $x_2$ expressed as (n·×1) vectors. This matrix is given by Haykin as:

$$X_{12} = \begin{bmatrix} x_1^T x_1 & x_1^T x_2 \\ x_2^T x_1 & x_2^T x_2 \end{bmatrix} \quad (10)$$

This can be implemented by iteratively forming a (2×2) matrix B by rotating the Equation (10) covariance matrix using a rotation matrix Q to force off-diagonal elements of B to zero, i.e.:

$$B = \begin{bmatrix} b_{11} & b_{12} \\ b_{21} & b_{22} \end{bmatrix} = Q^T \begin{bmatrix} x_1^T x_1 & x_1^T x_2 \\ x_2^T x_1 & x_2^T x_2 \end{bmatrix} Q = \quad (11)$$

$$\begin{bmatrix} \cos\Theta & -\sin\Theta \\ \sin\Theta & \cos\Theta \end{bmatrix} \begin{bmatrix} x_1^T x_1 & x_1^T x_2 \\ x_2^T x_1 & x_2^T x_2 \end{bmatrix} \begin{bmatrix} \cos\Theta & \sin\Theta \\ -\sin\Theta & \cos\Theta \end{bmatrix}$$

At each iteration of Given's rotation, the rotation matrix Q is determined which minimises off-diagonal elements of the symmetric matrix $X_{12}$. When the matrix $X_{12}$ becomes fully diagonal, i.e. when all its off-diagonal matrix elements have become zero, the signals it represents have become mutually orthogonal. This can be achieved by simply setting $b_{12}$ to zero in Equation (11), and determining a value of $\Theta$ that satisfies this. B is a symmetric matrix so $b_{12} \approx b_{21}$ and it is only necessary to determine $\Theta$ for $b_{12}=0$. By forcing $b_{12}$ and $b_{21}$ to be equal to 0, signals $x_1$ and $x_2$ are made orthogonal and hence B becomes a diagonal matrix. Thus, the diagonalisation of B can be a necessary condition for making vectors orthogonal.

Using Equation (7), a covariance matrix $X_k X_k^T$ is formed for $X_k$, i.e.:

$$X_k X_k^T = (\tilde{U}_k \tilde{\Sigma}_k R_k^T R_k V_k^T) V_k R_k^T R_k \tilde{\Sigma}_k^T \tilde{U}_k^T \qquad (12)$$

Because $R_k$ is a unitary matrix, and because estimates of signals contained in the rows of $\tilde{V}_k$ are orthogonal to one another:

$$\tilde{V}_k^T \tilde{V}_k = R_k^T R_k = I \qquad (13)$$

$$\text{Then } X_k X_k^T = \sim \tilde{\Sigma}_k \tilde{\Sigma}_k^T \sim_k^T = \sim \tilde{\alpha}_k \sim_k^T \qquad (14)$$

where $\tilde{\alpha}_k$ is an (m×m) diagonal matrix whose diagonal elements are eigenvalues of $X_k^T$.

Writing (k+1) for k in Equation (14), for the (k+1)th window, the covariance matrix $X_{k+1} X_{k+1}^T$ is expressed as:

$$X_{k+1} X_{k+1}^T = \tilde{U}_{k+1} \tilde{\alpha}_{k+1} \tilde{U}_{k+1}^T \qquad (15)$$

In order to avoid computing decorrelation afresh, the covariance matrix $\tilde{U}_{k+1} \tilde{\alpha}_{k+1} \tilde{U}_{k+1}^T$ is initialised by premultiplying by $\tilde{U}_k^T$ and postmultiplying by $\tilde{U}_k$, which were obtained for the immediately preceding or kth window, i.e.:

$$\tilde{U}_k^T (X_{k+1} X_{k+1}^T) \tilde{U}_k = \tilde{U}_k^T (\tilde{U}_{k+1} \tilde{\alpha}_{k+1} \tilde{U}_{k+1}^T) \tilde{U}_k \qquad (16)$$

Equation (16) represents $\tilde{U}_k$ initialising orthogonality for information or signals or vectors in the covariance matrix $X_{k+1} X_{k+1}^T$ of the data matrix $X_{k+1}$ using results obtained for the kth data window. Although signals represented in the covariance matrix $X_{k+1} X_{k+1}^T$ are not expressly those of the data matrix $X_{k+1}$, they are derived from those of the data matrix $X_{k+1}$. The expression "signals associated with data windows" and similar expressions as used herein therefore mean signals of the data matrix $X_{k+1}$ or signals derived from them such as those of the covariance matrix $X_{k+1} X_{k+1}^T$.

The covariance matrix $X_{k+1} X_{k+1}^T$ is a second order measure of the statistics of the data matrix $X_{k+1}$. Its initialisation is at 22 in FIG. 3, and initialisation improves the orthogonality of the vectors it contains. Initialisation also makes the matrix $\tilde{U}_k^T (X_{k+1} X_{k+1}^T) \tilde{U}_k$ on the left hand side of Equation (16) close to being diagonal, i.e. off-diagonal elements of this matrix become small. Instead of initialising the covariance matrix $X_{k+1} X_{k+1}^T$, one may alternatively use $\tilde{U}_k$ to initialise orthogonality for information or signals or vectors in the data matrix $X_{k+1}$ itself, and form the initialised covariance matrix from the results of this.

As previously mentioned, the covariance matrix being diagonal is a condition for conferring orthogonality upon vectors having covariance represented by that matrix. Initialisation at 22 is followed by a further improvement in orthogonality brought about using information from the (k+1)th data window as described below.

Now in a slowly changing system, $\tilde{U}_k^T \tilde{U}_{k+1} \approx I$ and $\tilde{U}_{k+1}^T \tilde{U}_k \approx I$, and so Equation (16) can be rewritten as:

$$\tilde{U}_k^T (\tilde{U}_{k+1} \tilde{\alpha}_{k+1} \tilde{U}_{k+1}^T) \tilde{U}_k \approx \tilde{\alpha}_{k+1} \qquad (17)$$

For an (m×m) symmetric matrix, and without initialisation of data, a Jacobi diagonalisation method is iterative with of order $m^3$ operations required for each sweep consisting of a single update of all the relevant signals represented as rows of the matrix $X_{k+1} X_{k+1}^T$. Many sweeps may be required. However, the matrix $(\tilde{U}_k^T X_{k+1} X_{k+1}^T \tilde{U}_k)$, initialised at 22 in accordance with the invention and given by Equations (16) and (17), is already close to representing a diagonal matrix: the Jacobi diagonalisation method therefore requires only a few iterations to converge. Thus, the computational cost is reduced in accordance with the invention by using an transformation to initialise signal orthogonality in the (k+1)th window, i.e. the current window.

The next step is to complete diagonalisation for the (k+1)th window using in this example the Jacobi method at 23. It employs matrices $\tilde{U}_z^T$ and $\tilde{U}_z$ which are eigenvectors estimated when applying Jacobi to the matrix $(\tilde{U}_k^T X_{k+1} X_{k+1}^T \tilde{U}_k)$ which has been initialised as regards orthogonality. $\tilde{U}_z^T$ and $\tilde{U}_z$ are rotation matrices implementing small rotations that diagonalise the initialised matrix $(\tilde{U}_k^T X_{k+1} X_{k+1}^T \tilde{U}_k)$, i.e. they should make vectors in this matrix orthogonal by updating as follows, i.e.:

$$\tilde{U}_z^T (\tilde{U}_k^T X_{k+1} X_{k+1}^T \tilde{U}_k) \tilde{U}_z = \tilde{\alpha}_{k+1} \qquad (18)$$

In Equation (18), $\tilde{U}_z$ is computed using Jacobi diagonalisation of the orthogonality-initialised covariance matrix in Equation (16): a unitary matrix is required to diagonalise this matrix. As before, the transform in the form of a rotation implemented by a matrix Q is sought such that $Q^T(X_{k+1} X_{k+1}^T)Q$ is diagonal, where $Q = \tilde{U}_k \tilde{U}_z$. This uses the fact that $\tilde{U}_k$ initialises data and $\tilde{U}_z$ is based on small updates. They can be used in the form of their product as they are both are unitary and their product is then also unitary. Estimates of eigenvectors $\tilde{U}_{k+1}$ for the (k+1)th window are expressed by:

$$\tilde{U}_{k+1} = \tilde{U}_k \tilde{U}_z \qquad (19)$$

and the estimated signals $(\hat{V}_{k+1}^T)$ are defined in Equation (24). This all occurs in stages 22 and 23.

For the higher order stage 25/27, signals obtained from Equation (24) are initialised in Equation (26) using $R_k$. This occurs in stage 25, shown in FIG. 3. This process initialises fourth order information in the signals obtained from Equation (24). To make these signals more fully independent or separated, they are updated using Equation (29). This occurs in stage 27.

Writing k+1 for k in Equation (5):

$$X_{k+1} = \tilde{U}_{k+1} \tilde{\Sigma}_{k+1} \tilde{V}_{k+1}^T \qquad (20)$$

Premultiplying Equation (20) by $\tilde{U}_{k+1}^T$:

$$\tilde{U}_{k+1}^T X_{k+1} = \tilde{U}_{k+1}^T \tilde{U}_{k+1} \tilde{\Sigma}_{k+1} \tilde{V}_{k+1}^T = \tilde{\Sigma}_{k+1} \tilde{V}_{k+1}^T \qquad (21)$$

Premultiplying Equation (21) by $\tilde{\Sigma}_{k+1}^{-1}$:

$$\tilde{\Sigma}_{k+1}^{-1} \tilde{U}_{k+1}^T X_{k+1} = \tilde{\Sigma}_{k+1}^{-1} \tilde{\Sigma}_{k+1} \tilde{V}_{k+1}^T = \tilde{V}_{k+1}^T \qquad (22)$$

where $\tilde{\Sigma}_{k+1}$ is a diagonal matrix having elements which are the square roots of the eigenvalues contained in the matrix $\tilde{\alpha}_{k+1}$, i.e.

$$\tilde{\Sigma}_{k+1} = \sqrt{\tilde{\alpha}_{k+1}} \qquad (23)$$

Orthonormal signal vectors contained in the matrix $\tilde{V}_{k+1}^T$ (for use in the higher order statistics stage 25/27 of the method 20) can be expressed by eliminating $\tilde{\Sigma}_{k+1}$ from Equation (22) using Equation (23), i.e.:

$$V_{k+1}^T = \tilde{\alpha}_{k+1}^{-1/2} \tilde{U}_{k+1}^T X_{k+1} \qquad (24)$$

The vectors or signals $\tilde{V}_{k+1}^T$ are decorrelated signals output from the second order stage 22/23 in FIG. 3. As described previously, they are related to unmixed signals (corresponding to independent source signals) by an unknown rotation matrix, as described with reference to FIGS. 2(c) and 2(d). The higher order statistics stage 25/27 is used to estimate this rotation matrix. To reduce computation once more, information from a previous window is used to initialise the separation process for a current window.

For the (k+1)th window, m orthonormal signal vectors each with non-zero eigenvalues and zero mean have been obtained as $\widetilde{V}_{k+1}^T$ from the Jacobi decorrelation stage 23. They are now expressed as a product of an (m×m) unitary rotation matrix $R_{k+1}^T$ and signal estimates $\hat{S}_{k+1}$ which are unmixed versions of the source signals 15.

$$\widetilde{V}_{k+1}^T = R_{k+1}^T \hat{S}_{k+1} \quad (25)$$

The estimates $\hat{S}_{k+1}$ are related to the source signals 15 by an arbitrary permutation to reflect possible signal swapping and a scale factor. It is necessary to estimate a rotation matrix $R_{k+1}$ which is the transpose and inverse of $R_{k+1}^T$ in order to multiply both sides of Equation (25) by it: this eliminates $R_{k+1}^T$ from the right hand side of Equation (25) and consequently recovers the required estimates $\hat{S}_{k+1}$. If the mixing matrix is changing slowly, then by using information from the preceding or kth window:

$$R_k \widetilde{V}_{k+1}^T = R_k R_{k+1}^T \hat{S}_{k+1} \quad (26)$$

Equation (26) expresses decorrelated signals output from step 23 having their independence initialised at 25 by multiplication by $R_k$ obtained from the kth data window. This initialises fourth order information in the decorrelated signals. To improve signal independence and separate the signals, they are updated in step 27 on the basis of the (k+1)th data window as follows:

$R_k R_{k+1}^T \approx I$ for slow change, and so:

$$R_k \widetilde{V}_{k+1}^T \approx \hat{S}_{k+1} \quad (27)$$

The higher order statistics stage 25/27 in a block based algorithm such as BLISS is implemented in accordance with the invention using the initialised matrix $R_k \widetilde{V}_{k+1}^T$ of signals from Equation (27). This stage is iterative with approximately the following number of operations per sweep, a sweep being a single update of all signal pairs in the matrix $R_k \widetilde{V}_{k+1}^T$.

$$\text{No. of operations per sweep} \approx 20\, m(m-1)n/2 \quad (28)$$

where the term m(m−1)/2 denotes the number of pairwise operations and n denotes the number of signal samples in the (k+1)th window or elements in the associated data matrix $X_{k+1}$. Since the signals defined in Equation (27) are close to being separated, only a few iterations of sweeps in the higher order statistics stage 25/27 will be required for convergence of the signals to separation. Separation is judged to have occurred when angles obtained from the BLISS estimation process are small. Initialisation in accordance with the invention reduces the number of computation steps required to unmix signals. Signal independence is improved by updating in step 25, and unmixed or separated estimates $\hat{S}_{k+1}$ of original signal sources are given by:

$$\hat{S}_{k+1} = R_z (R_k \widetilde{V}_{k+1}^T) \quad (29)$$

where $R_z$ is a unitary rotation matrix implementing a small rotation or update. $R_z$ is computed using the initialised vectors $(R_k \widetilde{V}_{k+1}^T)$ in the higher order stage 25/27. Similarly to $R_k$, $R_z$ is calculated by using an iterative sequence of pairwise rotations, each of which is designed to maximise the statistical independence of a respective pair of signals taken from $\widetilde{V}_{k+1}^T$, independence being measured by a corresponding pairwise cost function. A unitary rotation matrix $R_{k+1}$ for the (k+1)th window is required to rotate signal vectors obtained by decorrelation as described earlier. This uses the fact that $R_k$ initialises data and $R_z$ is a small update to $R_k$: they can be expressed as a product as they are both are unitary and their product is also unitary. The rotation matrix $R_{k+1}$ is therefore expressed as a product of an initialisation matrix and an update matrix, i.e.:

$$R_{k+1} = R_z R_k \quad (30)$$

The initialisation and update processes described with reference to Equations (19) to (30) can reduce the computation load associated with separating signals. Additionally, they can be used to prevent a known problem referred to as signal swapping as will be described later.

To summarise, Equation (16) represents initialisation by $\widetilde{U}_k$ of orthogonalisation of information (vectors or signals) in the data matrix $X_{k+1}$. This corresponds to step 22 of FIG. 3. To make the signals more fully orthogonal, they are updated in step 23 using Equation (18). Updated eigenvectors ($\widetilde{U}_{k+1}$) are estimated using Equation (19) and estimated signals ($\widetilde{V}_{k+1}^T$) are defined in Equation (24). For the higher order stage 25/27, at 25 the signals obtained using Equation (24) are initialised by $R_k$ using Equation (26). Step 25 initialises fourth order information in signals it has processed. To make these signals more fully independent or separated, in step 27 they are updated using Equation (29) to reflect the current (k+1)th window more fully.

Attention will now turn to the problem of signal swapping, which is illustrated in FIG. 4 for fetal ECG analysis. Data windows were used which were 4 seconds/2,000 samples long and 8 samples wide: i.e. there were eight signals each of 2,000 samples per window. A window overlap of 50% was used: i.e. the second half of each window was the first half of the immediately following window. The windows were processed in isolation and the sensors 14 consisted of eight signal electrodes together with ground and reference electrodes. This drawing shows eight signal traces 1 to 8 (marked on left) of amplitude against time: they are each intended to represent an individual separated signal, but instead each contains contributions from multiple signals. For example, trace 3 contains a first region 30 with peak periodicity appropriate for fetal ECG, a second region 32 with peak periodicity appropriate for maternal ECG and third regions 34 of noise.

Figure 5:
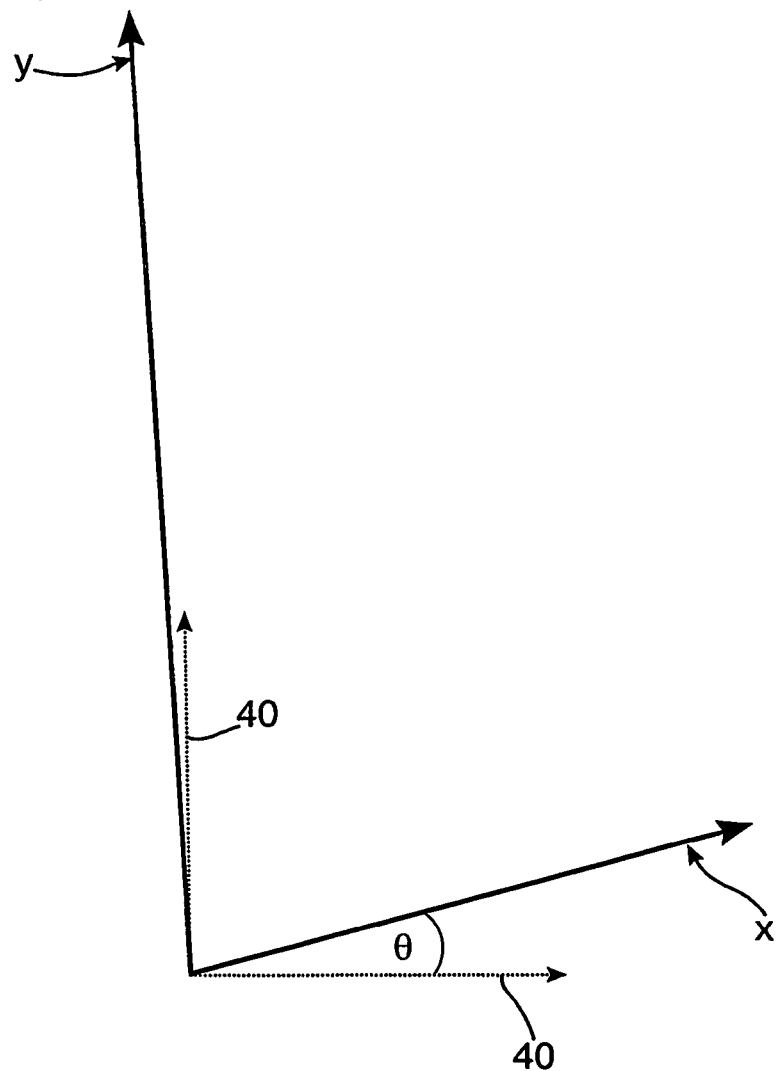
FIG. 5 is a vector diagram illustrating an update process employed in the invention.

The phenomenon of signal swapping can potentially occur in the second order stage 22/23 (Equations (17) to (22)) and/or the higher order stage 25/27. It is counteracted by applying only small rotation updates in the initialisation process previously described. 10 Here (as mentioned earlier) "small" means there is more than one possible rotation and the smaller/smallest is selected. For the purposes of the discussion to follow, x and y are vectors and each is a respective row of $\widetilde{V}_k^T$ representing all samples of a signal from a respective sensor extending the full length of a data window. After x and y are initialised in the second order stage 22/23, they are close to being orthogonal to one another. This is shown in FIG. 5, where initialised vectors x and y (solid arrows) are close to 90 degrees apart as indicated by orthogonal co-ordinate axes indicated by dotted lines 40.

To make the vectors x and y more accurately orthogonal, a relative rotation angle θ is introduced between them. This rotation is implemented by a decorrelation method such as Jacobi diagonalisation of a symmetric matrix as described earlier. For signals which are already close to orthogonal, two solutions are obtained by this method, i.e. $\theta \approx 0$ and $\theta \approx 90$ degrees. To avoid signal swapping the smaller value of $\theta \approx 0$ should be chosen. If the signals are indeed rotated relative to one another by the smaller value of $\theta$, this corresponds to a Givens rotation matrix given by:

$$\begin{bmatrix} \cos\theta & \sin\theta \\ -\sin\theta & \cos\theta \end{bmatrix} \approx \begin{bmatrix} 1 & 0 \\ 0 & 1 \end{bmatrix} \quad (31)$$

When $\theta \approx 0$ then a pair of initialised (nearly orthogonal) vectors x and y can be updated using:

$$\begin{bmatrix} x'^T \\ y'^T \end{bmatrix} \approx \begin{bmatrix} 1 & 0 \\ 0 & 1 \end{bmatrix} \begin{bmatrix} x^T \\ y^T \end{bmatrix} \quad (32)$$

In this case, the updated signals are in the same order and signal swapping has been avoided. This is in direct contrast to the case of $\theta \approx 90$, for which a Givens rotation matrix for rotating one vector relative to another is:

$$\begin{bmatrix} \cos\theta & \sin\theta \\ -\sin\theta & \cos\theta \end{bmatrix} \approx \begin{bmatrix} 0 & 1 \\ -1 & 0 \end{bmatrix} \quad (33)$$

Updating a pair of initialised vectors x and y using Equation (33) gives:

$$\begin{bmatrix} x'^T \\ y'^T \end{bmatrix} \approx \begin{bmatrix} 0 & 1 \\ -1 & 0 \end{bmatrix} \begin{bmatrix} x^T \\ y^T \end{bmatrix} \quad (34)$$

$$\begin{bmatrix} x'^T \\ y'^T \end{bmatrix} \approx \begin{bmatrix} -y^T \\ x^T \end{bmatrix}$$

In this case, the updated signals have swapped as indicated by the exchange of positions of $x^T$ and $-y^T$, and an inversion also occurs indicated by the negative sign of $-y^T$.

In the Jacobi decorrelation method, the smaller of the two angles is therefore chosen to achieve convergence to a solution. Thus, signal swapping is prevented in accordance with the invention when using an initialisation process for the second order stage and Jacobi with smaller angle updates. For validity, this approach relies on the system under consideration being slowly changing and resulting in the value of $\theta$ being small.

Figure 6:
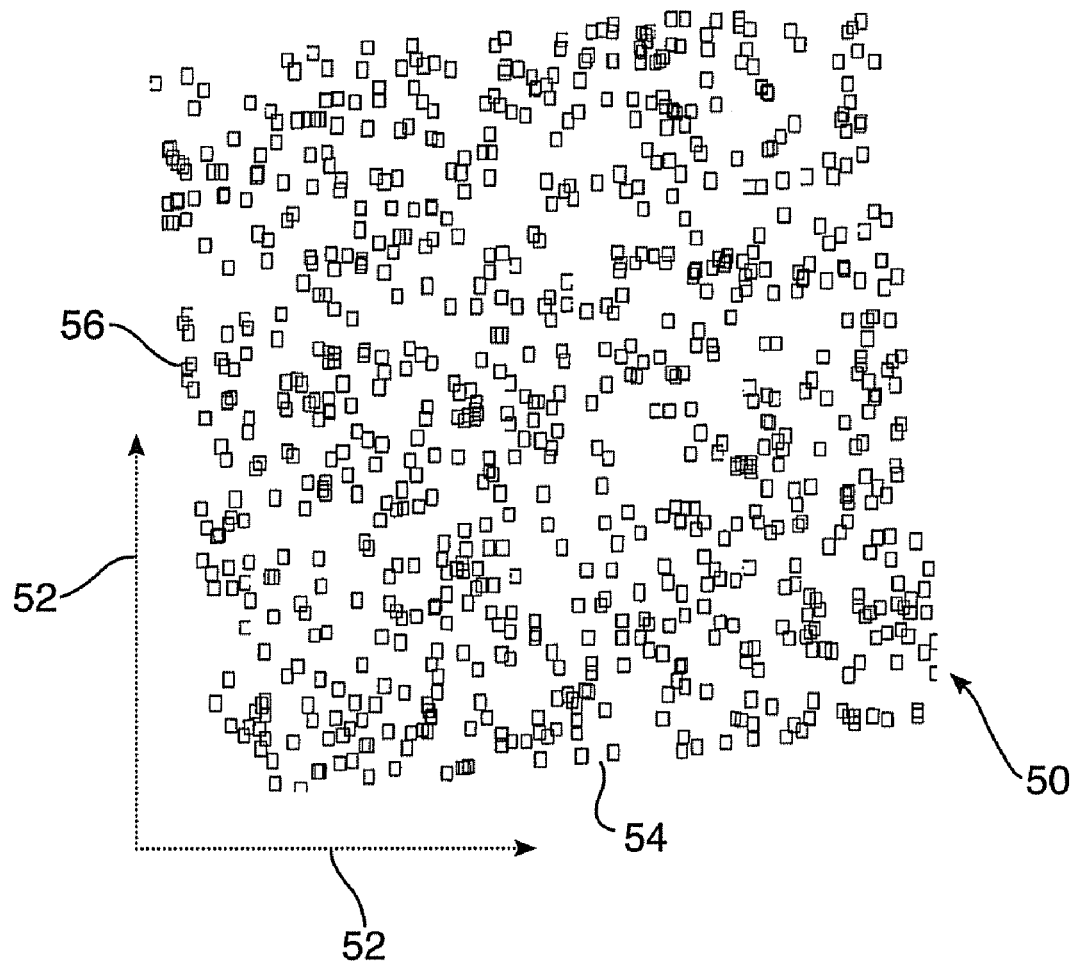
FIG. 6 is a scatter plot of two nearly independent signals.

Signal swapping can potentially occur in the higher order statistics stage also, as again there will be more than one solution or rotation angle to choose from. After $R_k$ is applied to data using Equation (27), estimated signal vectors will be related to corresponding source signals by a small rotation. In the BLISS or higher order statistics stage, since fourth order statistics are used, there are now four angles that can be chosen to achieve signal separation. This is illustrated in FIG. 6, which shows a scatter plot 50 of two nearly separated signals rotated through a small angle relative to Cartesian co-ordinate axes 52. If these signals were properly separated, the lower and left hand edges 54 and 56 of the scatter plot 50 would be aligned with respective axes 52. When signals are nearly separated in this way, the scatter plot 50 can be rotated by any one of four angles ($\theta \approx 0$, 90, 180 or 270 degrees) to align it with axes 52. Here again, in accordance with the invention, it has been found that choosing the smallest of the four angles ($\theta \approx 0$ degrees) avoids signal swapping.

As has been said, BLISS is based on fourth order statistics. It is also possible to use a technique based on third order statistics instead of BLISS, as described in "An Improved Cumulant Based Method for Independent Component Analysis", T. Blaschke and L. Wiskott, Proc. Int. Conf. on Artificial Neural Networks, ICANN'02, 2002. It is also possible to use a combination of third and fourth order statistics.

Figure 7:
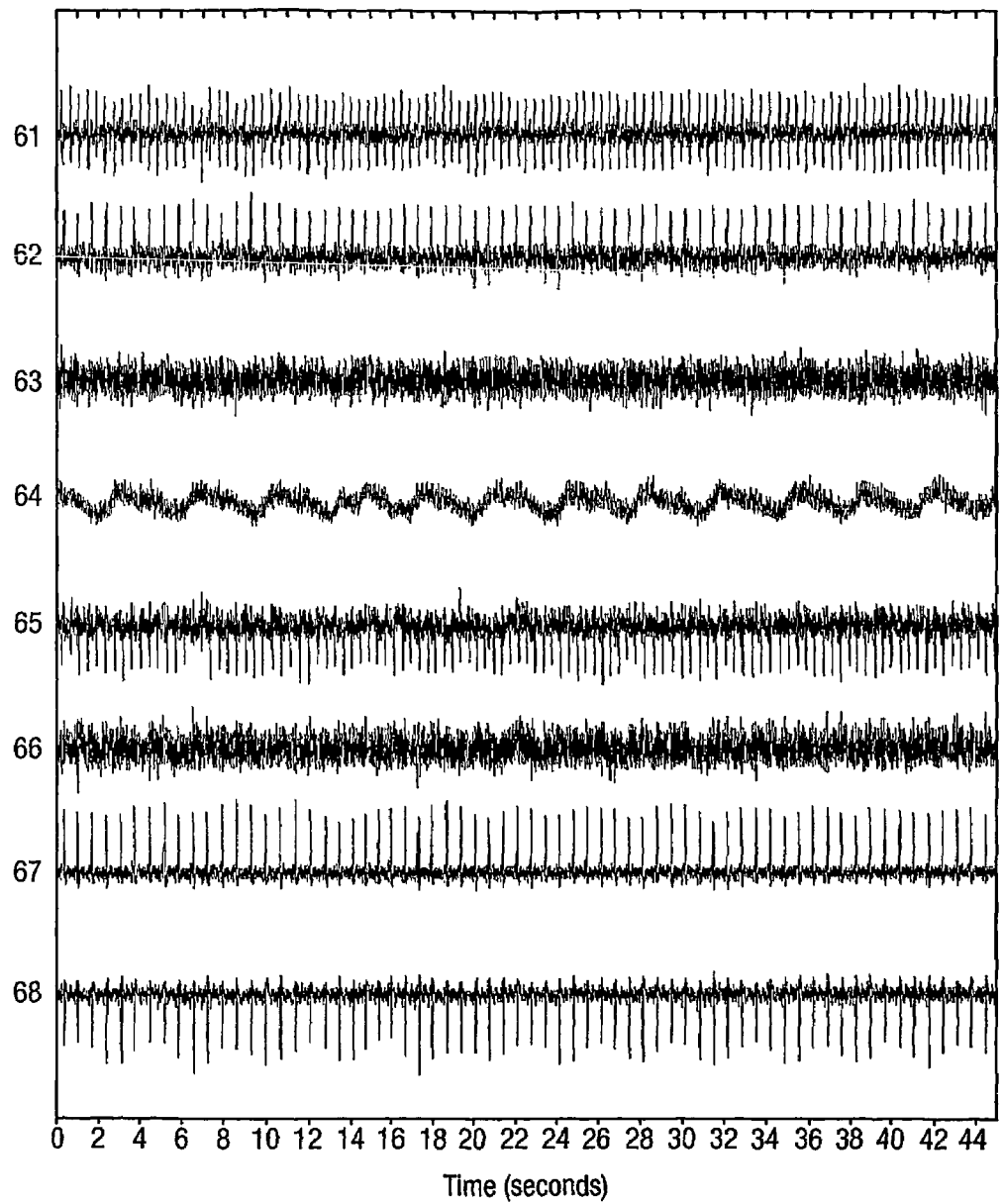
FIG. 7 illustrates signal separation with the invention using maternal and fetal ECG data.

The invention as described above was used for fetal ECG analysis using the data shown analysed in FIG. 4 but with signal swapping. Data windows were used which were 4 seconds/2,000 samples long and 8 samples wide with a window overlap of 50%: i.e. the second half of each window was the first half of the immediately following window. The sensors 14 consisted of eight signal electrodes together with ground and reference electrodes to yield eight signals. The windows were processed as indicated by Equations (17) to (30). Results are shown in FIG. 7. This drawing shows eight traces 61 to 68 (marked on left) of signal amplitude against time: they can clearly be seen to represent well-separated signals because signal characteristics do not change along each trace. For example, traces 61 and 65 both show ~140 beats/minute appropriate for fetal ECG; traces 62, 67 and 68 show ~87 beats/minute appropriate for maternal ECG. A noisy low frequency signal appears well separated on trace 64, and noise is separated out at 63 and 66. This demonstrates the ability of the invention to prevent signal swapping. The reason for there being e.g. more than one maternal ECG signal is that the heart is not a point source and there may be more than one ECG signal from the same extended source.

The initialisation and update processes also allow desired signals to be targeted alone. This technique avoids redundant computation incurred by tracking unwanted signals. It exploits the fact that signals of interest (e.g. maternal ECG and fetal ECG) can be classified in an acquisition stage. For fetal ECG analysis, this classification process could either depend on the choice of the user (clinician or doctor) or on a pattern classification technique. Pattern recognition methods for ECG signals are described by J. Pan and W. J. Tompkins in "A Real-Time QRS Detection Algorithm", IEEE Transactions on Biomedical Engineering 32(3): 230-236, 1985.

Once the desired signals are identified, this information can be used to focus or target processing on them. After classifying signals of interest in the acquisition stage 16, as compared to the invention without such targeting, the targeted technique only differs in restricting updating to desired signals in the signal separation stage 17.

Figure 8:
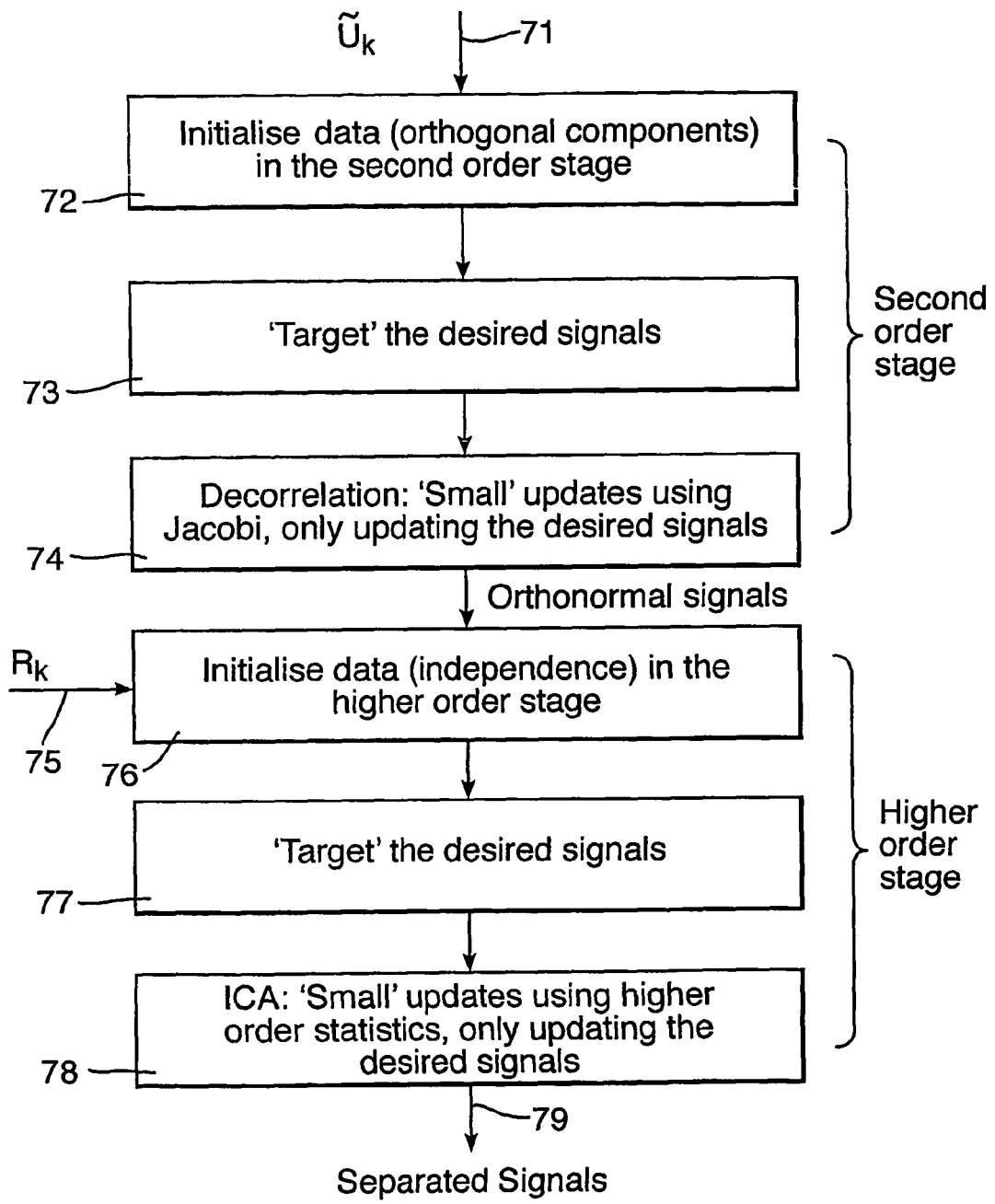
FIG. 8 is a block diagram of the method of the invention adapted to target specific signals.

FIG. 8 is a block diagram of signal separation 80 with desired signal targeting. Initialisation information consisting of the matrix $\tilde{U}_k$ from an immediately preceding (kth) data window is input at 71, and at 72 $\tilde{U}_k$ is applied to data in the (k+1)th data window to initialise its orthogonality. Desired signals are then targeted at 73 as will be described in more detail later, and only these desired signals (not others) are decorrelated at 74 with small update angles using Jacobi. Steps 72 to 74 are collectively and in statistical terms a second order stage of processing producing orthonormal signals. The kth window rotation matrix $R_k$ is then input at 75 and applied to the orthonormal signals at 76 to initialise their independence. Desired signals are then targeted once more at 77. The desired signals undergo separation at 78 by ICA with small angle updates using higher order statistics. Steps 76 to 78 are collectively a higher order stage of processing in statistical terms producing separated signals at an output 79.

Targeting of desired signals at 73 and 77 in FIG. 8 appears in both the second and higher order stages. This is not essential, one or the other may be used instead of both. Most benefit will be gained by targeting desired signals at 77 in the higher order stage. This higher order targeting approach will again use a process of initialising second order information, updating with Jacobi using Equation (16) and then initialising higher order data using Equation (27).

Before describing the targeting method in more detail, it is re-emphasised that a higher order stage 76 to 78 can be implemented using an iterative sequence of pairwise rotations. Each of these rotations is designed to maximise the statistical independence of two signals forming pair of signals, statistical independence being measured by an associated pairwise cost function. With m signals $v_1$ to $v_m$, there are $^mC_2$ or $m(m-1)/2$ signal pairs. After initialisation of these signals to form orthonormal vectors $v'_1$ to $v'_m$ with zero mean at 76, the total number of vector pairs are expressed as:

$$\begin{array}{cccc} v'_1 v'_2 & v'_1 v'_3 & v'_1 v'_4 & \cdots & v'_1 v'_m \\ & v'_2 v'_3 & v'_2 v'_4 & \cdots & v'_2 v'_m \\ & & \ddots & & \vdots \\ & & & \ddots & \\ & & & & v'_{m-1} v'_m \end{array} \quad (35)$$

In (35), it is assumed that the orthonormal vectors $v'_1$ to $v'_m$ are initialised using higher order information obtained using an immediately preceding data window as described previously. All of these pairs would have to be updated in an iterative sequence in the absence of targeting, which means that $m(m-1)/2$ pairs would need updating. In contrast to this, the targeting approach requires only to update pairs that include the desired vectors. This is possible as:

the initialisation and small update processes allow the vectors to maintain their order in the separation process (for each data window their locations in the triangle will not change); and by identifying the desired signals (maternal and fetal ECG in this example) in a signal acquisition stage, these signals can be denoted as vectors $v'_1$ and $v'_2$ in updating. Pairs involving only $v'_1$ and $v'_2$ individually and collectively can then be targeted.

If pairs involving $v'_1$ and $v'_2$ are targeted and no others, only the first two rows of (35) need updating. This involves only $(m-1)+(m-2)$ signal pairs, as opposed to $m(m-1)/2$ pairs for a full update. In this 'targeted' process, only the maternal and fetal signals will be separated. Separation of other signals is not accomplished, as in this example they are not required.

As described above, the targeting principle can also be applied to the second order stage 72-74. After an acquisition stage and by initialising second order information as in Equation (11) to produce an initialised covariance matrix, rows of this matrix that correspond to desired signals will be updated, but not other rows.

Figure 9:
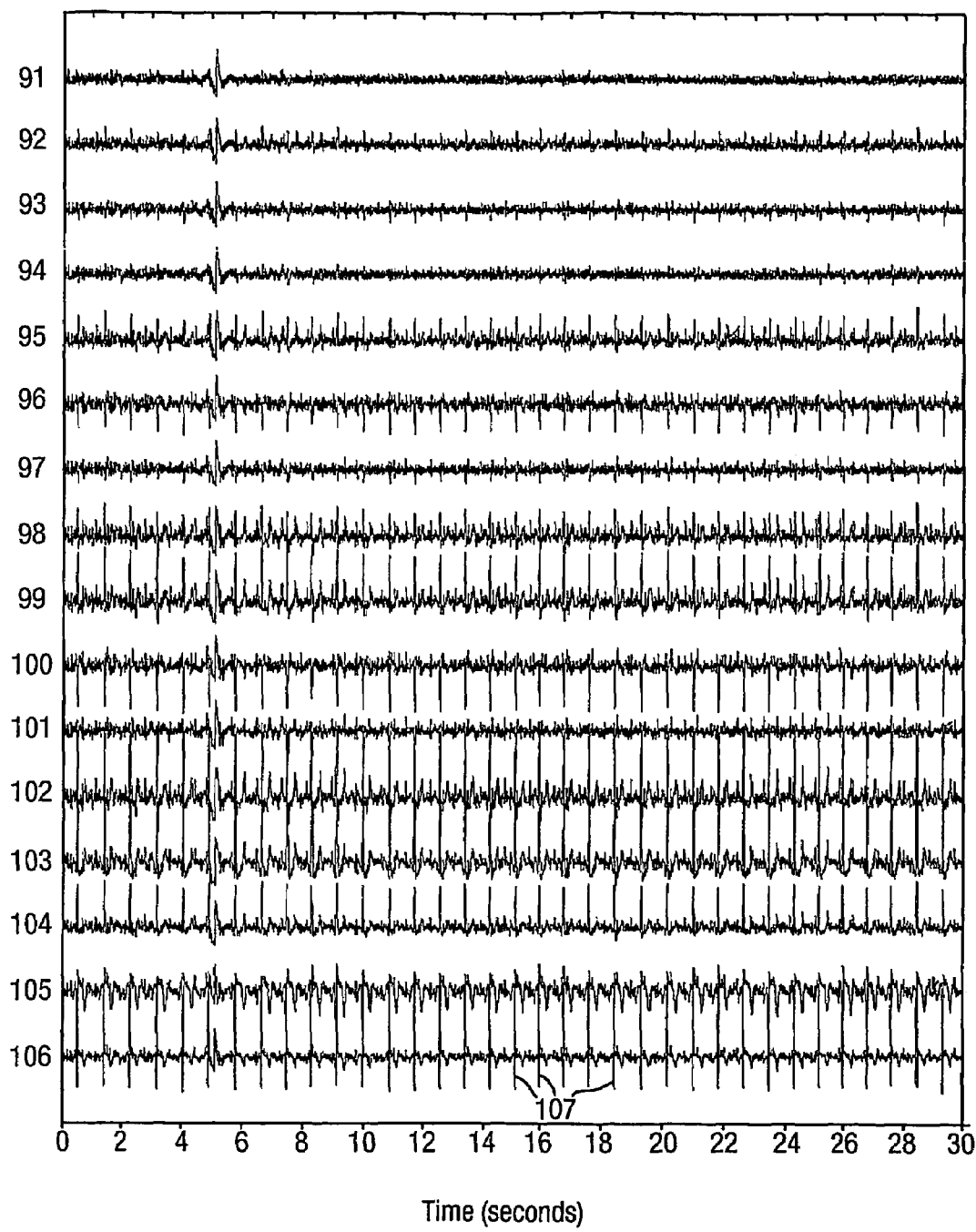
FIG. 9 shows ECG data prior to signal separation and obtained with external abdominal electrodes for a pregnancy involving twins.

Referring now to FIG. 9, there are shown ECG data obtained from a mother pregnant with twins. These data were obtained using 16 external abdominal signal electrodes with respective signal channels together with ground and reference electrodes as described in W550, except that signal separation was not used. Data was gathered over a 30 second time interval. There are 16 signal traces 91 to 106 (marked on left), in most of which (92, 93, 95-106) the strong maternal ECG signal can be seen as spikes such as 107 spaced by about 0.8 seconds (~72 beats/minute). Fetal ECG signals from the twins are not discernible over noise.

Figure 10:
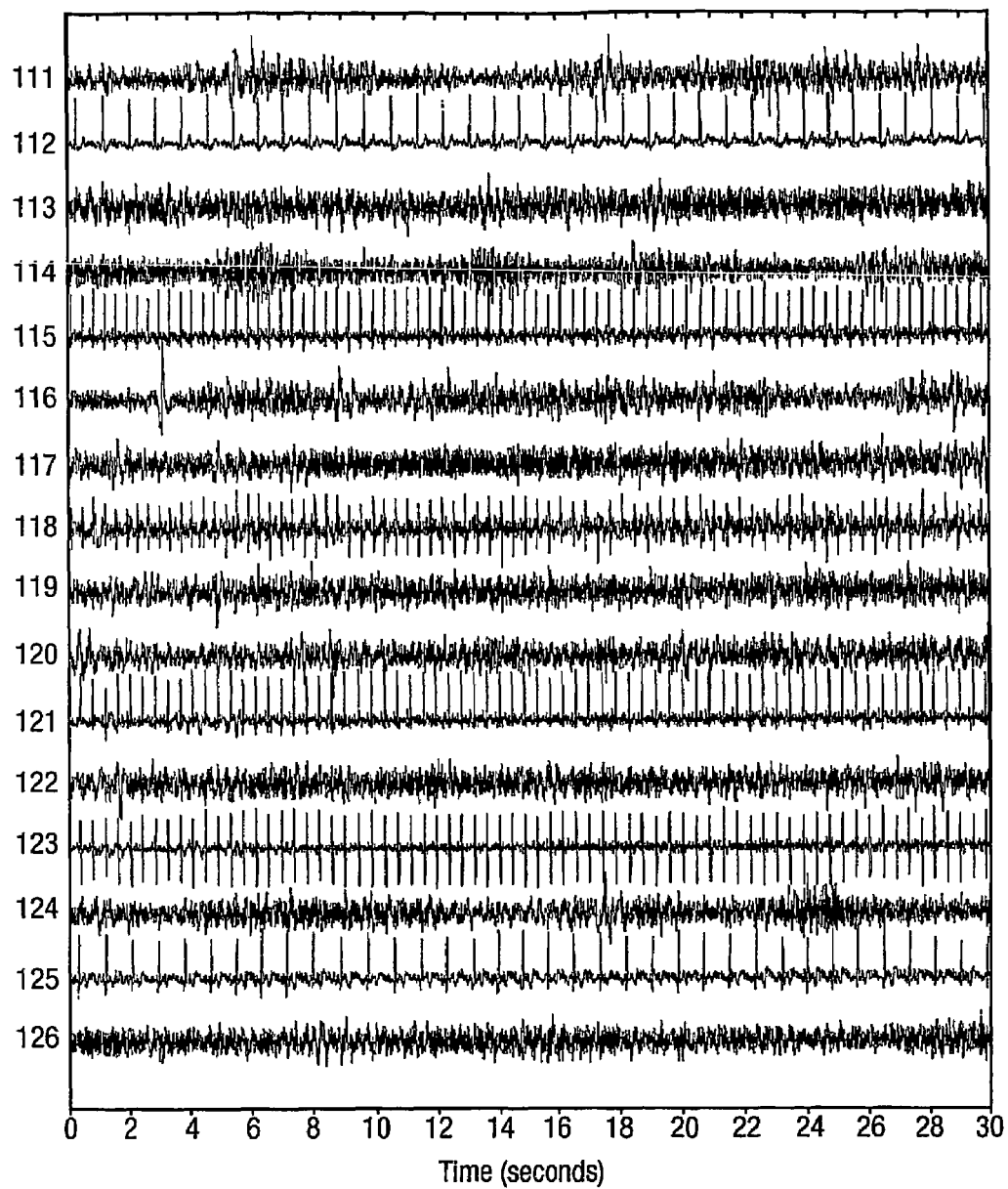
FIG. 10 provides results obtained using the invention to separate signals from the FIG. 9 data.

FIG. 10 shows results obtained using the technique of the invention to separate signals shown in FIG. 9, but without selecting out desired signals by targeting as described above. To process these signals, data windows were used which were 6 seconds/3000 samples in length and 16 samples in width because of the 16 signal channels. Each window overlapped the respective immediately preceding window by 60% (3.6 seconds). The drawing shows signal traces 111 to 126 (marked on left), where traces 112 and 125 are the maternal ECG. Traces 115 and 118 are the fetal ECG signal for one twin, and traces 121 and 123 are the fetal ECG signal for the other twin. The traces show that the signals are well separated and continuous, i.e. signal swapping has been prevented.

Application of the invention to produce the results shown in FIG. 10 involves the computational burden of tracking 16 signals. A signal detection procedure, such as the use of singular values in the acquisition stage, could have been used. Singular values provide an indication of the power of the signals in the data. However, as a fetal ECG signal is often weak this detection method is not accurate. Nevertheless, on separating signals in an acquisition stage they can be identified (using pattern matching) and the method of the invention can then be targeted to focus on desired signals. Pattern recognition techniques can be used to look for repeating shapes: e.g. a heart beat signal has a central section with a characteristic shape referred to in cardiology as a QRS section. The QRS of the maternal ECG should be much stronger and repeat less often than the QRS section of the fetal signal.

Figure 11:
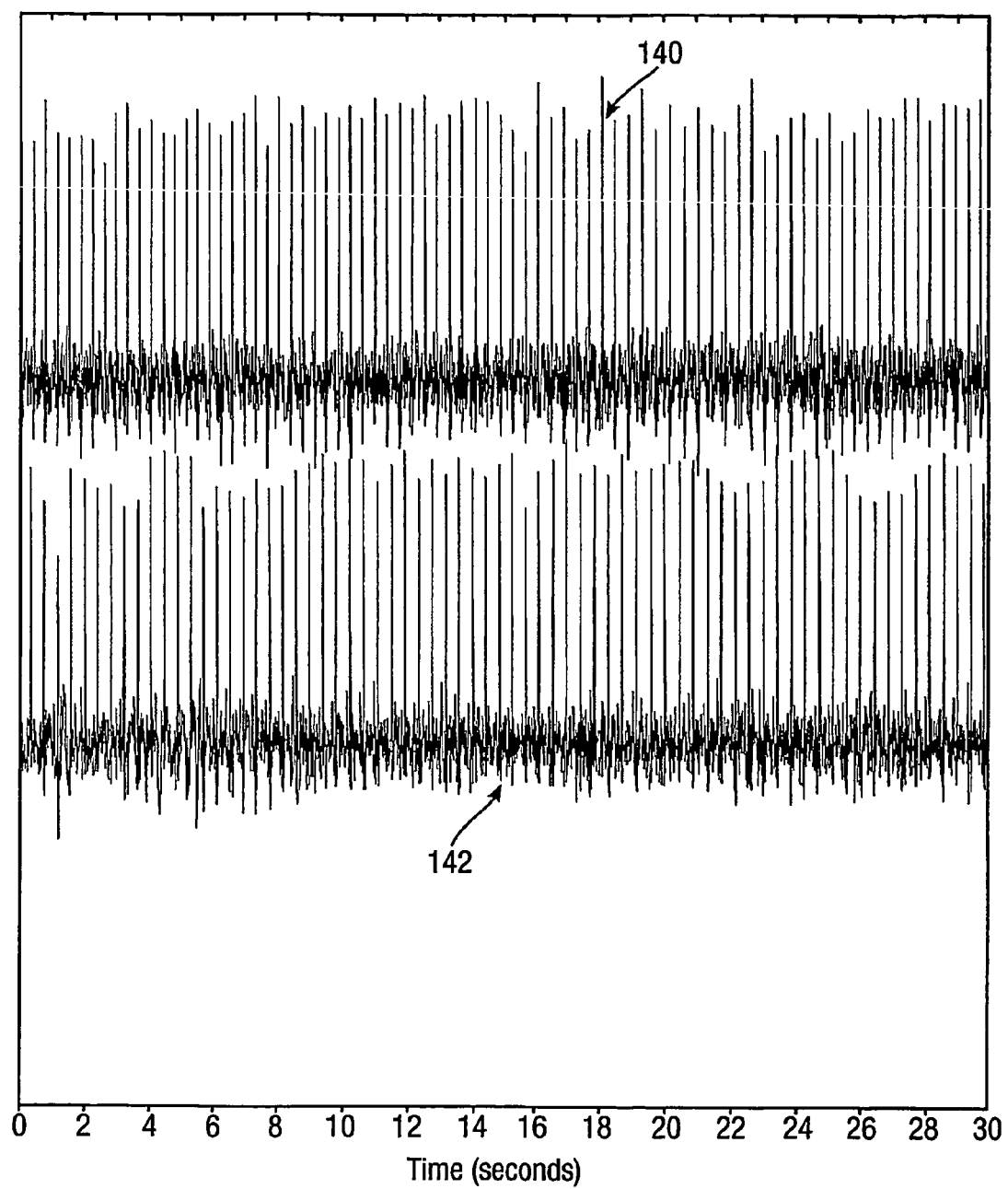
FIG. 11 provides results obtained using the method of the invention adapted to target twin fetal ECG signals in the FIG. 9 data.

FIG. 11 shows the results of applying the method of the invention in targeted form (in the higher order stage only) to fetal ECG signals from respective twins using the same data as that used in relation to FIG. 10. Two signals 140 and 142 are shown, each from a respective twin, and are again continuous, i.e. signal swapping has not occurred. The targeted method used the same acquisition stage 16 as the untargeted method. Signals 115 and 121 in FIG. 10 were identified by inspection as fetal ECG signals of different twins and these were tracked using the method of the invention in targeted form to give the results shown in FIG. 11. In the targeted approach, a first block of data is used in an acquisition stage, and all available signals are processed to separation so that desired signals may be selected from them. Desired signals may be identified either by:

the user by inspection, or one of a number of pattern recognition techniques, which are widely available in scientific literature.

After the acquisition stage, only desired signals are processed to full separation. Once the order of the separated signals has been determined in the acquisition stage, as shown in the triangle of signals in (35), the signals can be re-ordered such that the desired signals occupy the top rows of the triangle: i.e. signals 115 and 121 in FIG. 10 would become the first and second signals in that example. The initialisation and update processes then maintain this order, i.e. the signals can be targeted because their positions in the update process are known.

Figure 12:
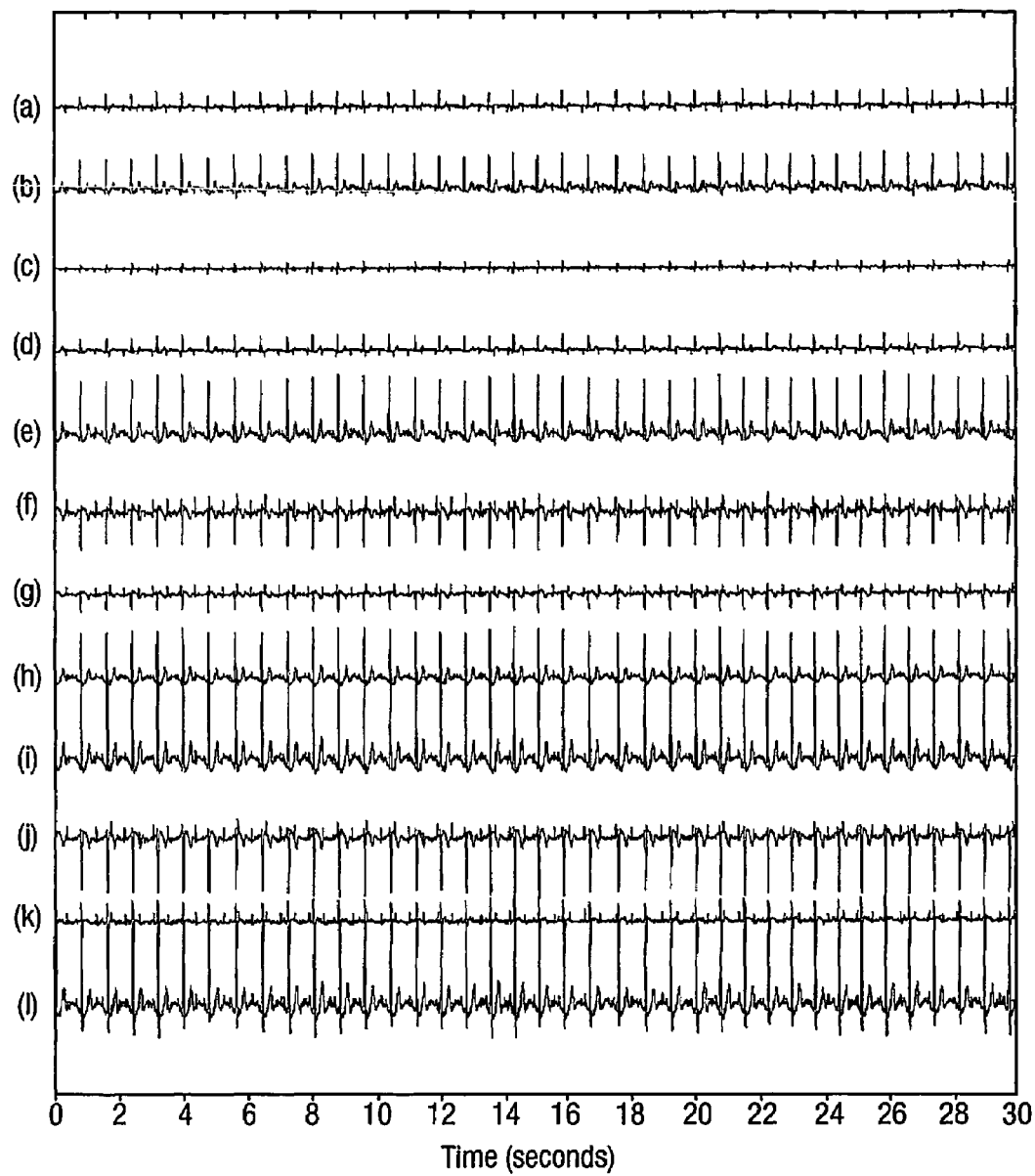
FIG. 12 shows singleton fetal ECG data prior to signal separation.
Figure 13:
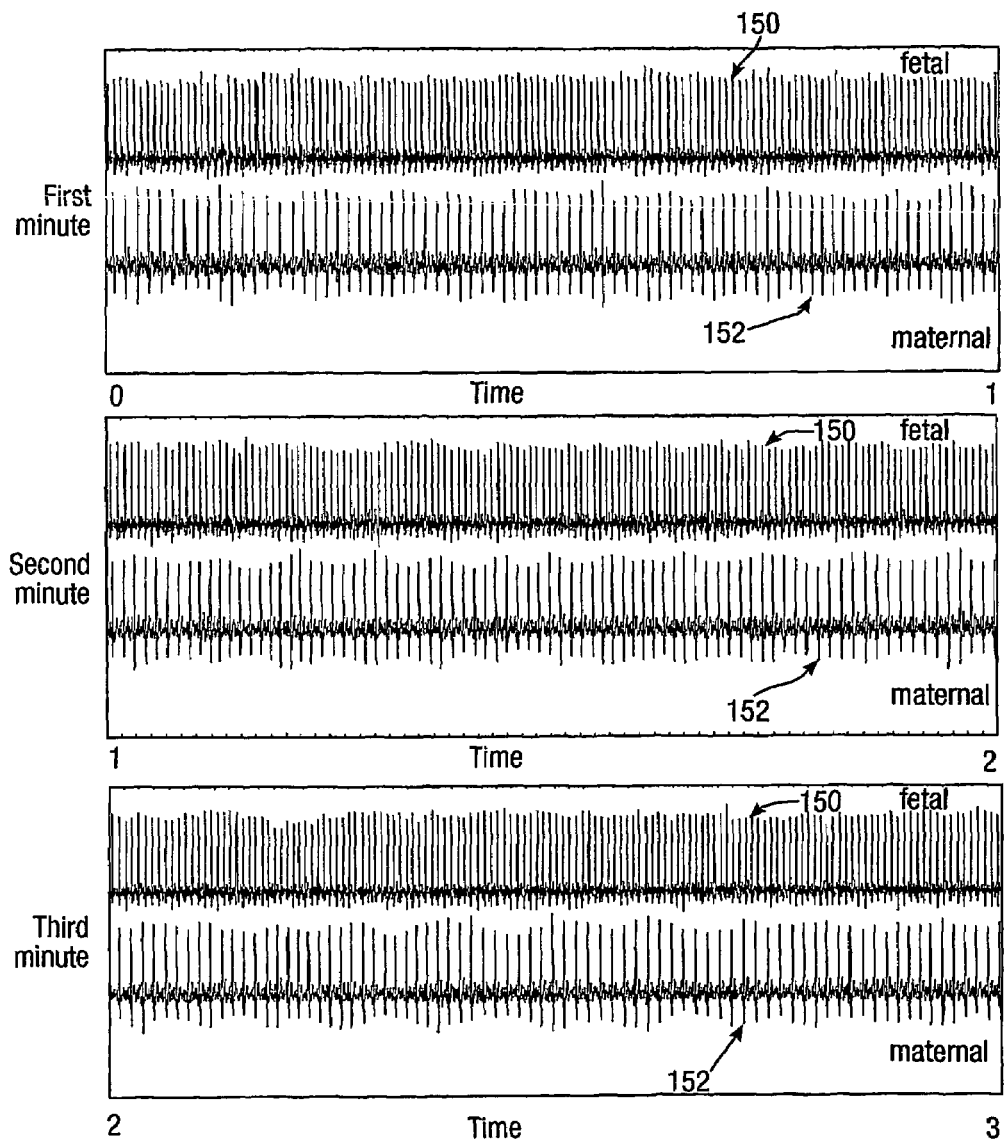
FIG. 13 provides results obtained using the method of the invention adapted to target ECG signals in the FIG. 12 data.

In a second example, the targeted method of the invention was applied to a singleton fetal ECG recording, i.e. an ECG of a single fetus. The recording employed twelve signal electrodes and associated ground and reference electrodes and lasted for three minutes. In FIG. 12, a thirty second interval of the recording is shown of twelve signals (a) to (l) associated with respective electrodes. To process this recording of a data set, data windows of length 6 seconds with zero window overlap (i.e. contiguous windows) were used. The results are shown in FIG. 13 as three plots against time for the first (0-1), second (1-2) and third (2-3) minutes of the recording respectively, and like signals are like-referenced. The plots show signals 150 and 152, which correspond to the fetal and maternal signal respectively. These signals are continuous, i.e. they have not swapped.

Figure 14A:
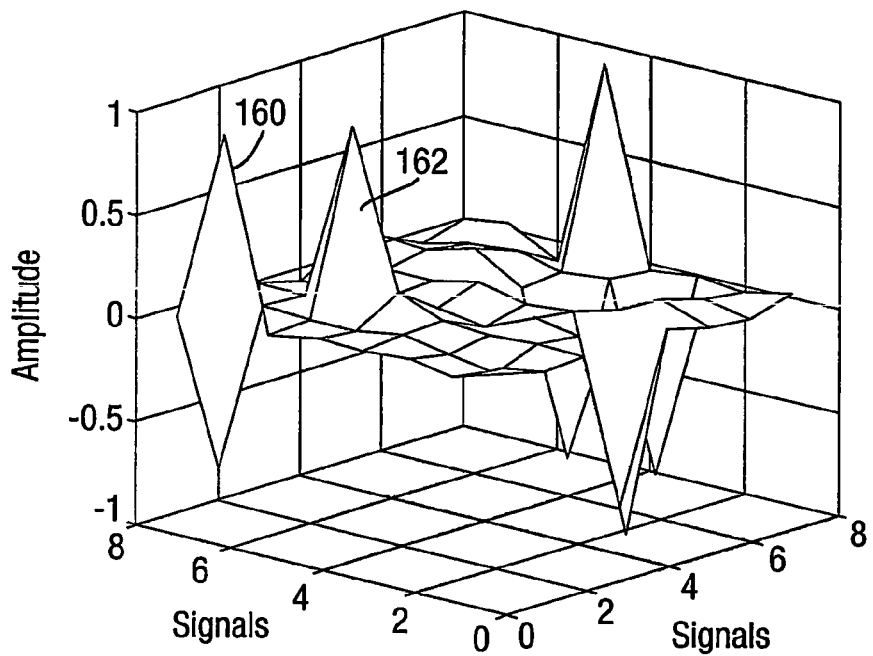
FIG. 14 shows pseudo three-dimensional plots of cross-correlated signals before and after correction for signal swapping.
Figure 14B:
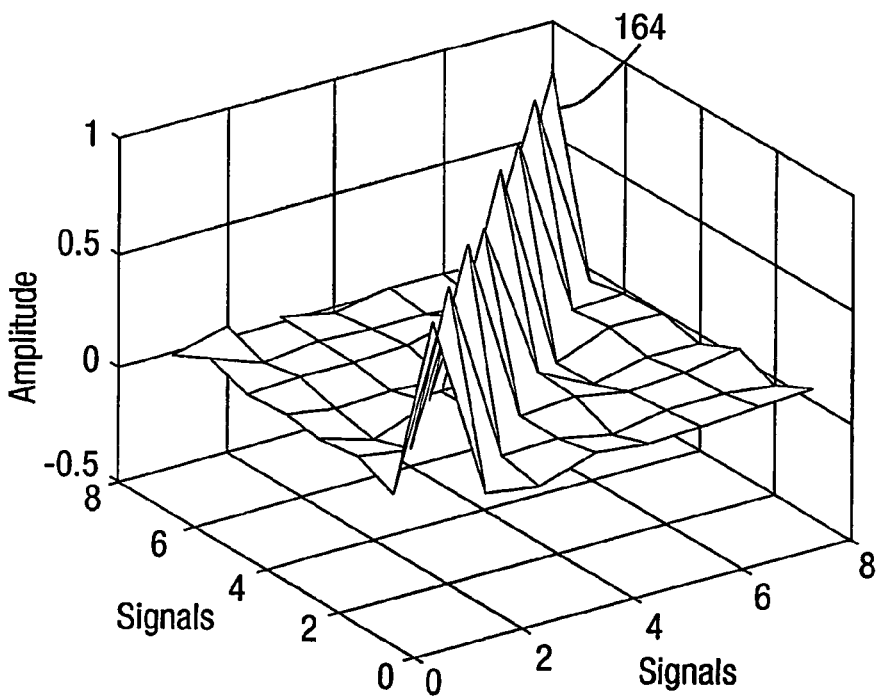

Another method for dealing with signal swapping is to use overlapping windows and a cross-correlation of overlapping estimated signals which result. For example, let overlapping sections of estimated signals in windows k and k+1 be f samples long and be represented by (m×f) matrices $\hat{S}_{ok}$ and $\hat{S}_{ok}$ respectively. The rows of these matrices contain the estimated signals and the overlapping sections will contain similar signals. The matrix $\hat{S}_{ok}$ is related to $\hat{S}_{ok+1}$ by:

$$\hat{S}_{ok+1} \approx DP\hat{S}_{ok} \tag{36}$$

where D denotes an (m×m) matrix, whose diagonal elements are 1 or −1 (providing for signal inversions) and P denotes an (m×m) permutation matrix (providing for signal swapping). These conditions arise in adjacent windows as the estimated signals can be ordered differently and inversions are also possible. The overlapping sections of the estimated signals are ordered until this correlation matrix resembles a diagonal matrix. In this case, the signals will be in the same order. This technique is described in by G. Spence in "A Joint Estimation Approach for Periodic Signal Analysis", PhD thesis, Queen's University Belfast, June 2003. FIG. 14 illustrates this technique. In FIG. 14(a) eight signals from one window are correlated with eight signals from an immediately following window. A peak 160 indicates that signal no. 8 from one window corresponds to signal no. 2 from the other window, and similar remarks apply to other peaks such as 162. Signal swapping is corrected by redesignating signals so that the same signal number is associated with correlated signals from the two windows. This yields the situation shown in FIG. 14(b), which is as FIG. 14(a) except for redesignation of signals. Here peaks such as 164 indicating correlated signals appear on the diagonal only.

Referring now to FIG. 15, electrode apparatus suitable for implementing fetal ECG monitoring is indicated generally by 170. It comprises a number of abdominal electrodes 171a, 171b, 171c, G and R suitable for placing on the surface of a mother's skin and monitoring voltage signals developed there: here G indicates a ground electrode, R a reference electrode and 171a to 171b are signal electrodes. For convenience only five electrodes 171a etc. are shown, but as many may be used as are necessary having regard to the number of signals to be separated. The electrodes 171a etc. are connected via respective screened leads 172a to 172e to a lead box 173, which is also connected to a computer 174.

The lead box 173 contains processing circuitry for signals from the signal electrodes 171a etc. are shown inset at 173a: circuitry is shown for two signal electrodes 171a and 171b, dots D indicate like circuitry for other signal electrodes. The circuitry comprises for each signal electrode 171a etc. a respective low-noise differential amplifier 175 with an analogue high-pass filter and an analogue low-pass anti-aliasing filter both incorporated in a filter unit 176. The filters 176 are connected to a common multi-channel analogue to digital converter (ADC) 177. The amplifiers 175 subtract a signal from the reference electrode R from signals from respective signal electrodes 171a etc., and amplify the resulting difference signals. The difference signals are converted to digital signals by the ADC 177, and are then recorded and processed using the computer 174 to separate signals as described earlier.

Figure 16:
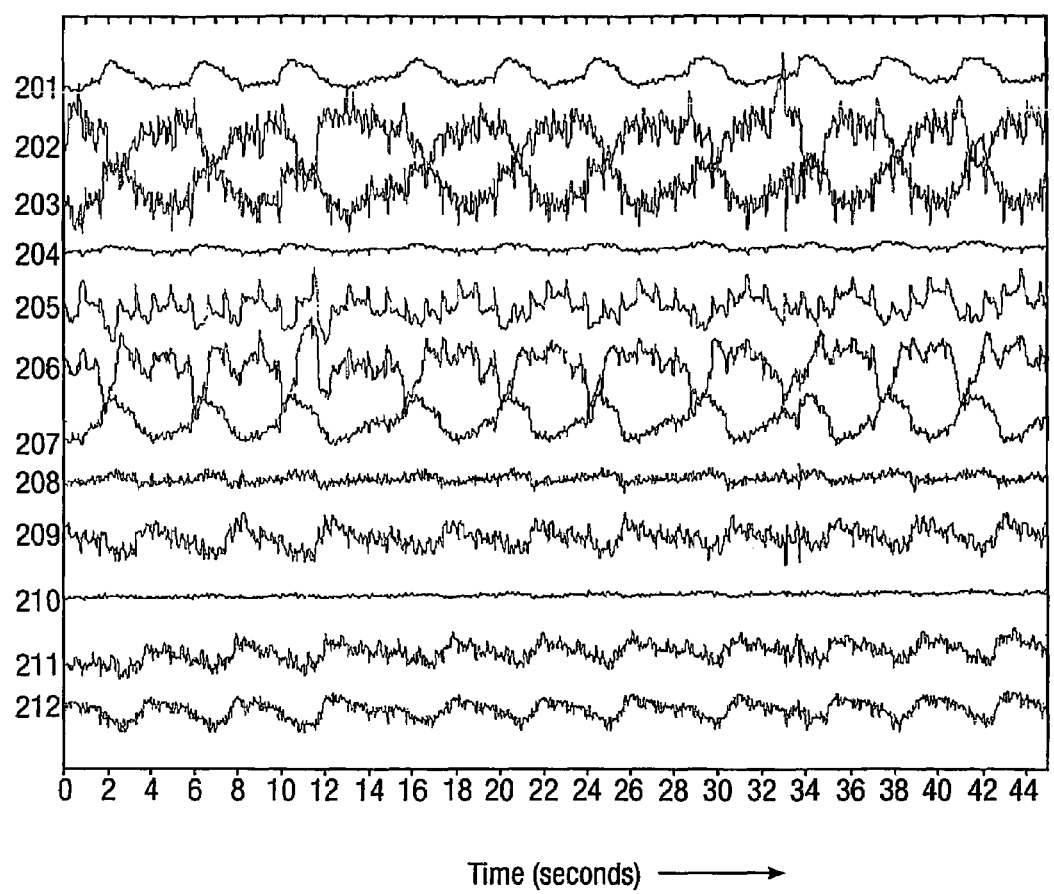
FIG. 16 shows heartbeat/breathing data prior to signal separation and obtained with sensors under a mattress on which a patient lay.
Figure 17:
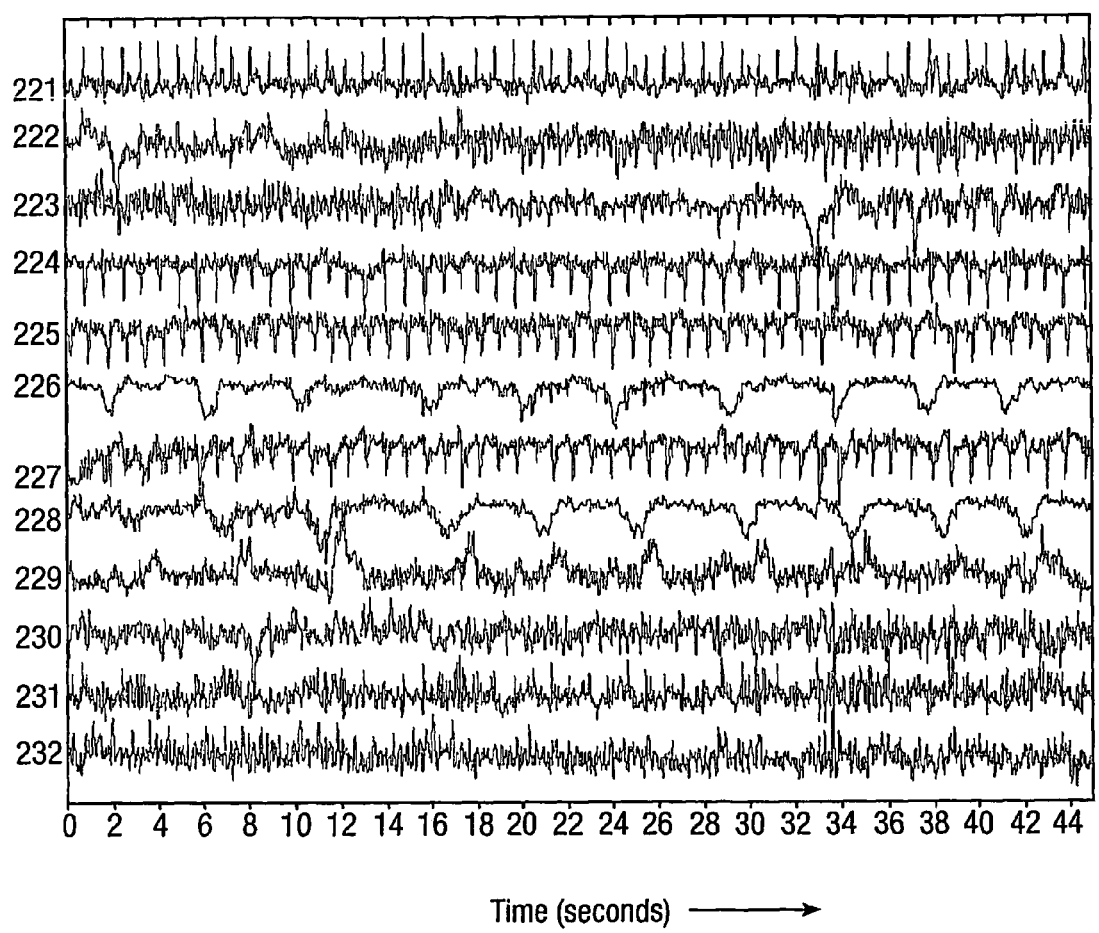
FIG. 17 provides results obtained using the invention to separate signals from the FIG. 16 data.

Referring now to FIGS. 16 and 17, these show recording of signals and separated signals respectively for a further application of the invention, albeit physiological monitoring once more. The application is passive sleep recording to detect heart and breathing rates. This can help determine if a person is suffering from sleep apnoea (inability to breathe giving quickened heart rate).

Twelve signals 201 to 212 (marked on left) in FIG. 16 were sampled at 250 Hz using 12 sensors placed under a mattress on which a patient lay. The signals indicate vibration received by the sensors though the bed/mattress. Fifty data windows each 4000 signal samples long (16 seconds) were processed using a window overlap of 85%. All available signals were processed, i.e. signals were not targeted. The reason for the large window overlap is that the invention is based on an assumption that conditions are slowly varying between successive windows, so the time difference between the beginnings of two successive windows must be sufficiently short to satisfy this assumption and make the initialisation process more accurate. In the present case, satisfying this criterion led to a time difference of only 15% of a data window (2.4 seconds). When conditions permit, it is preferable to use non-overlapping contiguous windows as fewer data windows are required and processing time is minimised.

In FIG. 17, twelve separated signals 221 to 232 (marked on left) are shown: of these signals 221, 224 and 225 are estimated heart signals with periodicity ~0.83 seconds. Signals 226 and 228 are estimated signals associated with breathing with periodicity ~4.4 seconds.

It is possible in principle to envisage implementing signal separation without initialisation and update processes, but with the above ordering technique to correct the problem of signal swapping. However, this has disadvantages. It would sacrifice the ability of the invention to exploit the computationally efficient targeted approach. Additionally, to provide reliable estimates in the cross-correlation technique, a large window overlap would have to be used. This means, that in order to process the data, a larger number of windows is required: e.g. with 50% Window overlap the data is processed twice (and takes twice as long) compared to processing once (i.e. with no overlap). This is disadvantageous because it lengthens the time between detection of mixed signals by sensors 14 and generation of unmixed signals. In the case of fetal ECG in particular, this is important because it may be necessary for a clinician to intervene rapidly if a heartbeat abnormality is detected, and it may be too late to save the fetus if processing time is too long.

The foregoing example of the invention may also be applied to complex-valued data. The principles of initialising the second and higher order stages and using small updates remain unchanged; however complex-valued versions of the second order stage (Jacobi) and higher order (ICA) stage are required. The use of ICA for complex-valued data is well researched and many decorrelation and ICA techniques have been developed for this problem. For more information on a complex-valued Jacobi refer to: S. Haykin, "Adaptive filter theory, second edition", Prentice Hall, ISBN 0-13-013236-5, 1991.

In addition, more information about complex-valued ICA methods can be found in:

P. Comon, "Independent component analysis, A new concept", Signal Processing 36, pp. 287-314, 1994.

I. J. Clarke, "Exploiting non-Gaussianity for signal separation", MILCOM 2000. 21st Century Military Communications Conference Proceedings, Volume: 2, 22-25 Oct. 2000.

In the last of the above three references, Clarke showed that an extended version of BLISS can deal with complex signals by treating their in-phase and quadrature components as individual real signals. By using Jacobi and this extended version of BLISS small updates of the initialised signals are again possible. This is because the smaller angle is chosen in the Jacobi technique and the rotation of the initialised signals in the higher order stage will again depend on fourth order statistics.

The equations for a complex-valued version of the invention, in the (k+1)th window, can be summarised in four stages as follows. The superscript index H denotes the hermitian of a matrix or vector. These equations can also be used to represent the real-valued case.

1. Initialisation in second order stage:

$$\tilde{U}_k^H(X_{k+1}X_{k+1}^H)\tilde{U}_k = \tilde{U}_k^H(\tilde{U}_{k+1}\tilde{\alpha}_{k+1}\tilde{U}_{k+1}^H)\tilde{U}_k \quad (37)$$

2. Update using complex-valued Jacobi:

$$\tilde{U}_z^H(\tilde{U}_k^H X_{k+1}X_{k+1}^H \tilde{U}_k)\tilde{U}_z = \tilde{\alpha}_{k+1} \quad (38)$$

$$\tilde{U}_{k+1} = \tilde{U}_k \tilde{U}_z \quad (39)$$

$$\tilde{V}_{k+1}^H = \tilde{\alpha}_{k+1}^{-1/2} \tilde{U}_{k+1}^H X_{k+1} \quad (40)$$

3. Initialisation in higher order stage:

$$R_k \tilde{V}_{k+1}^H = R_k R_{k+1}^H S_{k+1} \quad (41)$$

4. Update using complex-valued ICA $$\hat{S}_{k+1} = R_z(R_k \tilde{V}_{k+1}^H) \quad (42)$$

$$R_{k+1} = R_z R_k \quad (43)$$

Equations (39) and (40) represent updated eigenvectors and orthonormal signals respectively. Equations (42) and (43) represent updated independent signals and the higher rotation matrix respectively. The four stage process is summarised as described earlier with reference to FIG. 3. The targeted aspect of the invention is also applicable to the complex-valued case, and this is again involves updating only the signal pairs that include the desired signals.

Equations given in the foregoing description for calculating intermediate quantities and results can clearly be evaluated by an appropriate computer program embodied in a carrier medium and running on a conventional computer system. Such a program and system are straightforward for a skilled programmer to implement without requiring invention, and will therefore not be described further.

A further embodiment of the invention will now be described. When processing data from sensors in real-time, only one or a few data snapshots may be available to update a data matrix at a time: here a "snapshot" is defined as a set of simultaneous data samples, a respective single sample of a signal from each of the sensors, i.e. a column of the data matrix. In such cases, any moving data window approach as described earlier will require a large amount of window overlap, i.e. the position of the window can only be moved a limited amount between successive processing stages. Thus a large number of windows may be required to cover the data: for each window, this corresponds to a significant degree of and perhaps a large amount of redundancy as the window's statistics (although initialised to the desired solution) will be re-computed. One approach for dealing with this for a sliding window version of the invention (the example described earlier) is to subtract the statistics of the oldest snapshot(s) from the overall statistics. The statistics of the latest added snapshot(s) are then computed and added to the difference between the overall statistics and those of the oldest snapshot(s). There are also two ways of implementing the BLISS algorithm: one version operates directly on sensor signals or digitised equivalents, and the other operates directly on a fourth order tensor derived from those signals. Sets of results from these versions will be equivalent and may be used for the moving window approach of the preceding embodiment.

The redundancy problem may also be avoided by using a recursive update approach: in this approach signal separation is implemented using weighted measures of statistics for old data computed earlier (and not recomputed) and newly computed statistics obtained from most recently added data. This approach is not conceptually dissimilar to the moving window approach previously described. It once more uses initialisation and small update processes, and again these are applied in the second and higher order statistics stages. However, instead of using a moving window approach with a rectangular window, an exponential fading window is used. This allows the invention to process the latest available data snapshot(s) recursively while avoiding the problem of recomputing overlapping regions of windows. It then follows that redundancy is minimal, because the statistics of overlapping window sections are not recomputed.

In this embodiment, the recursive update approach is divided into two parts. The first part uses a rectangular window of data as in the previous embodiment, and this is referred to as the acquisition stage. In the acquisition stage signals are separated as previously described. The first, second and higher order statistics of data are calculated in the acquisition stage for use in a second stage, in which these statistics are recursively updated (see Tables 2 to 4). In the acquisition stage which spans n samples, the data is defined as an (m×n) data matrix $X_0 = [x_1 \ x_2 \ldots x_m]^T$ with rows $x_1$ to $x_m$ each representing a respective sensor output signal. $X_0$ is therefore represented by m vectors $x_1$ to $x_m$ each with n elements. The subscript index 0 of $X_0$ and other parameters in Table 1 indicates t=0 for the acquisition stage. Fourth order moments which form a tensor are set out in Table 1 below: these provide a measure of the relationship between four vectors of arbitrary kind e.g. $y_i$, $y_j$, $y_k$ and $y_l$ such that tensor elements $M_{ijkl}$ are given by:

$$M_{ijkl} = E(y_i y_j y_k y_l) \quad (44)$$

$$= \frac{1}{n}\sum_{\tau=1}^{n} y_i(\tau)y_j(\tau)y_k(\tau)y_l(\tau)$$

where $y_i(\tau)$ denotes the τth sample of vector $y_i$: here τ is an integer time index, and expresses a sample time when multiplied by a time interval $T_s$ between successive samples.

TABLE 1

Acquisition stage: definitions of first, second and fourth order statistics
Acquisition Stage

| | | |
|---|---|---|
| Compute mean vector $v_0$ of signal samples $x_1(\tau)$ etc. in data matrix $X_0$ | $v_0 = \frac{1}{n}\left[\sum_{\tau=1}^{n} X_1(\tau) \ \sum_{\tau=1}^{n} X_2(\tau) \cdots \sum_{\tau=1}^{n} X_m(\tau)\right]^T$ | (45) |
| Form covariance matrix $\chi_0$ of $X_0$ | $\chi_0 = (1/n) X_0 X_0^T$ | (46) |
| Decorrelate and normalise $X_0$ | $X_0 = \tilde{U}_0 \tilde{\Sigma}_0 \tilde{V}_0^T$ | |

TABLE 1-continued

| | | |
|---|---|---|
| Rearrange to obtain $\tilde{V}_0^T$: | $\tilde{V}_0^T = \tilde{\Sigma}_0^{-1} \tilde{U}_0^T X_0$ | |
| $\tilde{V}_0^T$ rows are signal vectors $v_i$ etc.: | $v_i, v_j, v_k, v_l$ where i, j, k, l = 1 to m | (47) |
| Form fourth order tensor $M_0$ as moment of $v_i, v_j, v_k, v_l$. | $M_0 = \text{moment}(v_i, v_j, v_k, v_l)$ i, k, j, l = 1 to m $M_0 \in \mathcal{R}^{m \times m \times m \times m}$ This denotes $M_0$ as a fourth order tensor: here $\in$ means "exists in", $\mathcal{R}$ means "real part of", and the four m indices of $\mathcal{R}$ denote four dimensions | (48) |

Each element $M_{ijkl}$ of $M_0$ is defined as:

$$M_{ijkl} = E(v_i v_j v_k v_l) \quad (49)$$

$$= \frac{1}{n} \sum_{\tau=1}^{n} v_i(\tau) v_j(\tau) v_k(\tau) v_l(\tau)$$

where $v_i(\tau)$ is a sample of the ith signal vector $v_1$ at time $\tau$, $\tau$ is in units of a sampling time interval, and n is the number of samples per vector as previously indicated.

Using the definitions in Table 1, the second or recursive update stage of this example may be defined mathematically as follows. For convenience of explanation this is described in terms of successive updates each made using data comprising the preceding data window with the contributions of previous snapshots diminished by weighting and addition of a single snapshot of new data per update; this means that progressively older data is progressively more diminished. Each snapshot has an index number t, where t=1 to T in units of a sampling time interval, and the first or acquisition stage is denoted by t=0. This embodiment of the invention is not however limited to a single snapshot per update.

For convenience, the data snapshot (hitherto $x_t$) will now be defined as $d_t$, and the decorrelated and normalised equivalent of the snapshot obtained from the second order statistics stage (hitherto $v_t$) will now be defined as $z_t$.

After acquisition and for each snapshot $d_t$, a respective mean vector $v_t$ is recursively updated using Equation (50) below and subtracted from the data snapshot using Equation (51) below. In the following Tables 2-4, processes in the recursive update stage are defined. For cases in which each update involves more than one snapshot, the mean is calculated over all snapshots in the update.

TABLE 2

Recursive update of the mean of the data
First Order Statistics

| | | |
|---|---|---|
| Compute mean from earlier mean and current snapshot | $v_t = (1-p)v_{t-1} + pd_t$ | (50) |
| Subtract mean from current snapshot | $\tilde{d}_t = d_t - v_t$ | (51) |

Equations (50) and (51) provide for first order statistics to be generated from an exponentially fading window of data by the use of p and (1−p), which are referred to in signal processing as "forget factors". The value of p lies between 0 and 1, and so p and (1−p) progressively reduce the effect of older data. In this example p is likely to lie between 0 and 0.1. Exponential fading occurs because (1−p) and p are applied on each update, so the more updates that follow a snapshot the more its effect diminished: e.g. after u updates the wth updating snapshot is diminished by $p(1-p)^{u-w+1}$, snapshots in the acquisition stage window being ignored as regards the value of w. The value of the forget factor p may be set in relation to the acquisition data window length. It also provides the advantage that p may be set adaptively to reflect confidence in data: e.g. the value of p may be adjusted upwards or downwards during processing depending on whether the data's noise component is reducing or increasing.

The next part of the processing procedure in the recursive update stage employs Equations (52) to (56) in Table 3 below. In this part, second order statistics expressed by the data matrix's covariance matrix $\chi_t$ are recursively updated using Equation (52): here the covariance matrix $\chi_t$ for time t is produced by adding (1−p) times the covariance matrix $\chi_{t-1}$ for time (t−1) to p times the covariance matrix $\tilde{d}_t \tilde{d}_t^T$ of the new data snapshot $\tilde{d}_t$ to provide an exponentially fading window once more. For the first update, t−1=0 indicates that the relevant preceding results are from the acquisition stage described with reference to Table 1. The covariance matrix $\chi_t$ has orthogonal components which are initialised in Equation (53) by premultiplication by $U_{t-1}^T$ and postmultiplication by $U_{t-1}$, as described in the preceding embodiment (see Equation (16)). Here and subsequently xr. (r=1, 2 . . . ) will be used to denote the r mode product, such that for the second order case $XX^T = U\lambda U^T = \lambda \times 1 U \times 2 U$, where U, $\lambda$ and T are as defined earlier. The expression $\lambda \times 1 U \times 2 U$ therefore means the matrix U is applied to the first dimension of $\lambda$ and then to the second dimension of $\lambda$. As in the preceding embodiment, the objective in the present embodiment is to diagonalise the second order data covariance matrix, albeit this matrix is generated from a recursive update in Equation (52) instead of by processing a whole data window. In Equation (54) the matrix $U_{t-1}^T \chi_t U_{t-1}$ is diagonalised using small updates and the results of updating are defined in Equations (55) and (56). Equation (56) produces a second order estimate $z_t$ of a single snapshot, because in this embodiment each update involves a single snapshot. If each update is implemented with multiple snapshots, the estimate will be for multiple snapshots also.

TABLE 3

Recursive update of second order statistics
Second order statistics

| | | |
|---|---|---|
| Update second order statistics - statistics using an exponentially fading window. | $\chi_t = (1-p)\chi_{t-1} + p\tilde{d}_t\tilde{d}_t^T$ | (52) |
| Initialise orthogonality | $U_{t-1}^T \chi_t U_{t-1} = \chi_t \times 1 U_{t-1}^T \times 2 U_{t-1}^T$ | (53) |
| Small updates for decorrelation | $\lambda_t = (U_{t-1}^T \chi_t U_{t-1}) \times 1 U_z^T \times 2 U_z^T$ | (54) |
| Eigenvectors $U_t$ for current data snapshot | $U_t = U_{t-1} U_z$ | (55) |
| Second order estimate $z_t$ of snapshot | $z_t = \lambda_t^{-1/2} U_t^T \tilde{d}_t$ | (56) |

The next (higher order statistics) part of this embodiment employs Equations (57) to (62) in Table 4 below. The current estimate of the snapshot from Equation (56) in the second order stage is passed to the higher order stage. The fourth order moment tensor of this snapshot is formed in Equation (57), and it is recursively updated. This tensor is approximately diagonalised by application of $R_{t-1}$ in Equation (59), and small updates $R_z$ are then used to diagonalise it more fully in Equation (60). The diagonalisation of this fourth order tensor is a requirement for signal separation in this example. Again, these can be calculated using the BLISS algorithm. The rotation matrix is determined using Equation (61), and an estimate of the signals (for time t) is given by Equation (62). These are the same types of processes as in the earlier embodiment, except that now fourth order statistics are generated from a recursive update.

TABLE 4

Recursive update of fourth order statistics
Higher order statistics

| | | |
|---|---|---|
| Form fourth order tensor of vectors $z_i$ etc. Single snapshot update: the iiii element $\xi_{iiii}$ of $\xi_t$ is defined as: $\xi_{iiii} = z_i^4$ | $\xi_t = \text{mom}(z_i, z_j, z_k, z_l)$ i, j, k, l = 1.to.m where $z_i$ to $z_l$ are the ith to lth samples of the vector $z_t$, and $\xi_t \in \Re^{m \times m \times m \times m}$ | (57) |
| Update higher order statistics using forget factor p giving an exponentially fading window of data | $M_t = (1 - p)M_{t-1} + p\xi_t$ | (58) |
| Initialise independence of tensor $\kappa_t$: $\kappa_t$ is now approximately diagonalised | $\kappa_t = M_t \text{x1} R_{t-1} \text{x2} R_{t-1} \text{x3} R_{t-1} \text{x4} R_{t-1}$ $\kappa_t \in \Re^{m \times m \times m \times m}$ | (59) |
| Diagonalise $\kappa_t$ using small updates | $\kappa_t \text{x1} R_z \text{x2} R_z \text{x3} R_z \text{x4} R_z$ | (60) |
| Estimate rotation matrix $R_z$ based on small updates | $R_t = R_z R_{t-1}$ | (61) |
| Estimate of signal snapshot $s_t$ | $s_t = R_z(R_{t-1} z_t) \ldots$ | (62) |

In practice, recursive updating may be implemented using more than one snapshot per update, in which case this embodiment yields as many estimated signal snapshots as there are snapshots per update.

In this embodiment, Equations (50), (52) and (58) represent statistics that are generated from signals that span an exponentially fading window, i.e. using a forget factor to bias processing. For the moving window approach in the first example described with reference to FIGS. 1 to 17, statistics are generated from a rectangular window. Equations (51), (53) to (56) and (59) to (62) are the same processes as in the first embodiment. Only in the higher order stage the tensor version of BLISS is used. This allows fourth order statistics to be updated.

Analysis of electroencephalogram (EEG) measurements by a clinician is a well established technique for diagnosing brain dysfunction such as epilepsy, brain tumour and brain injury. However, in practice, this analysis can be very difficult as EEG measurements produce weak electrical signals which are susceptible to severe corruption by unwanted electrical interference (artefact): such interference arises from sources such as eye movement and/or blink (ocular artefact) and muscle activity of the patient and from mains power supply interference.

A BSS approach may be used to suppress unwanted interference in order to isolate signals of interest in EEG data. When desired EEG signals are repetitive ('pseudo-continuous') a tracking BSS method can be used to track them, and thus allow long-term monitoring. Clinical EEG data were obtained from a patient suffering from repetitive epileptic seizures. These data yielded repetitive EEG signals, i.e. EEG voltage against time: they were obtained conventionally by applying eight scalp electrodes to a patient and monitoring electrode voltages with EEG equipment. The EEG signals consisted of repeated epileptic seizure signals adulterated by interference. Epileptic seizures in the signals could be inferred but not reliably discerned from interference; for example, counting signal maxima for any of the eight signals did not yield the correct number of seizures. The recursive tracking embodiment of the invention was applied to the EEG signals to provide an estimated signal. An acquisition stage was used that spanned five seconds and each update was produced using a respective set of 128 data snapshots with a sample rate of 256 Hz, i.e. 0.5 second to produce 128 data samples. The estimated signal did not suffer from signal swapping and it showed repetitive epileptic seizures indicated by easily discernable spikes of greater amplitude than interference. The signal to interference and noise ratio was in the range 3 to 6 as the spikes varied in height.

The invention claimed is:

1. A method for dynamic blind signal separation having the following steps:
   a) processing signals associated with pairs of windows of data each having a leading window and a following window;
   b) producing orthogonality initialised signals by using results obtained in connection with the respective leading window to initialise orthogonality of signals associated with the following window;
   c) updating orthogonality of initially orthogonalised signals using following window data to produce updated orthogonalised signals;
   d) producing independence initialised signals by using further results obtained in connection with the respective leading window to initialise independence of updated orthogonalised signals; and
   e) updating independence of independence initialised signals using following window data to produce independence updated signals designated as separated signals.

2. A method according to claim 1 wherein the step of updating orthogonality is implemented using small updates to produce decorrelation in a second order statistics procedure.

3. A method according to claim 2 wherein the step of updating orthogonality is implemented by a technique referred to as Jacobi and involving diagonalisation of a symmetric matrix by determining and applying small rotation angles iteratively until off-diagonal elements of the matrix become substantially equal to zero.

4. A method according to claim 3 wherein the step of updating independence is implemented using independent component analysis (ICA) to apply small rotation updates in a higher than second order statistics procedure.

5. A method according to claim 4 wherein the higher than second order statistics procedure is at least one of a third order and a fourth order statistics procedure.

6. A method according to claim 1 including:
   a) an acquisition phase in which signals are separated and desired signals are identified among the separated signals, and
   b) a subsequent phase in which only desired signals are processed to separation.

7. A method according to claim 1 wherein the signals associated with pairs of windows are statistical measures of data in the windows.

8. A method according to claim 1 incorporating:
   a) an acquisition stage of processing a first leading window of data to obtain first statistics, and
   b) a subsequent stage of processing following windows by iteratively updating immediately preceding statistics using subsequent data snapshots to produce snapshot statistics and combining the snapshot statistics with the immediately preceding statistics, the immediately preceding statistics being those obtained in a respective immediately preceding iterative update if any and being the first statistics otherwise.

9. A method according to claim 8 wherein prior to combining the snapshot statistics with the immediately preceding statistics, the immediately preceding statistics are weighted with a forget factor to implement an exponentially fading following window.

10. Computer apparatus for dynamic blind signal separation programmed to process signals associated with windows of data wherein the computer apparatus is also programmed to:
   a) process signals associated with pairs of windows of data each having a leading window and a following window;
   b) use results obtained in connection with the respective leading window to initialise orthogonality of signals associated with the following window to provide orthogonality initialised signals;
   c) update orthogonality of orthogonality initialised signals on the basis of the following window to produce orthogonality updated signals;
   d) use further results obtained in connection with the respective leading window to initialise independence of orthogonality updated signals to produce independence initialised signals; and
   e) update independence of independence initialised signals on the basis of the following window to produce independence updated signals designated as separated signals.

11. Computer apparatus according to claim 10 programmed to update orthogonality using small updates to produce decorrelation in a second order statistics procedure.

12. Computer apparatus according to claim 11 programmed to update orthogonality by a technique referred to as Jacobi and involving diagonalisation of a symmetric matrix by determining and applying small rotation angles iteratively until off-diagonal elements of the matrix become substantially equal to zero.

13. Computer apparatus according to claim 12 programmed to update independence using ICA to apply small rotation updates to initialised data in a higher than second order statistics procedure to produce signal independence and separation.

14. Computer apparatus according to claim 13 wherein the higher than second order statistics procedure is at least one of a third order and a fourth order statistics procedure.

15. Computer apparatus according to claim 10 programmed to implement an acquisition phase in which signals are separated and desired signals are identified among the separated signals, and a subsequent phase in which only desired signals are processed to separation.

16. Computer apparatus according to claim 10 wherein the signals associated with windows of data are statistical measures of data in the windows.

17. Computer apparatus according to claim 10 programmed to implement an acquisition stage of processing a first leading window of data to obtain first statistics, and a subsequent stage of processing following windows by iteratively updating immediately preceding statistics using subsequent data snapshots to produce snapshot statistics and combining the snapshot statistics with the immediately preceding statistics, the immediately preceding statistics being those obtained in a respective immediately preceding iterative update if any and being the first statistics otherwise.

18. Computer apparatus according to claim 17 programmed to implement an exponentially fading following window by weighting the immediately preceding statistics with a forget factor prior to combining the snapshot statistics with the immediately preceding statistics.

19. A computer software product comprising a computer readable medium containing computer readable instructions for controlling operation of computer apparatus to implement dynamic blind signal separation by processing signals associated with windows of data, wherein the computer readable instructions provide a means for controlling the computer apparatus to:
   a) process signals associated with pairs of windows of data each having a leading window and a following window;
   b) use results obtained in connection with the respective leading window to initialise orthogonality of signals associated with the following window to provide orthogonality initialised signals;
   c) update orthogonality of orthogonality initialised signals on the basis of the following window to produce orthogonality updated signals;
   d) use further results obtained in connection with the respective leading window to initialise independence of orthogonality updated signals to produce independence initialised signals; and
   e) update independence of independence initialised signals on the basis of the following window to produce independence updated signals designated as separated signals.

20. A computer software product according to claim 19 wherein the computer readable instructions also provide a means for controlling the computer apparatus to update orthogonality using small updates and produce decorrelation in a second order statistics procedure.

21. A computer software product according to claim 20 wherein the computer readable instructions also provide a means for controlling the computer apparatus to update orthogonality by a technique referred to as Jacobi and involving diagonalisation of a symmetric matrix by determining and applying small rotation angles iteratively until off-diagonal elements of the matrix become substantially equal to zero.

22. A computer software product according to claim 20 wherein the computer readable instructions also provide a means for controlling the computer apparatus to update independence using ICA to apply small rotation updates in a higher than second order statistics procedure.

23. A computer software product according to claim 22 wherein the higher than second order statistics procedure is at least one of a third order and a fourth order statistics procedure.

24. A computer software product according to claim 19 wherein the computer readable instructions also provide a means for controlling the computer apparatus to implement an acquisition phase in which signals are separated and desired signals are identified among the separated signals, and a subsequent phase in which only desired signals are processed to separation.

25. A computer software product according to claim 19 wherein the signals associated with windows of data are statistical measures of data in the windows.

26. A computer software product according to claim 19 wherein the computer readable instructions also provide a means for controlling the computer apparatus to implement an acquisition stage of processing a first leading window of data to obtain first statistics, and a subsequent stage of processing following windows by iteratively updating immediately preceding statistics using subsequent data snapshots to produce snapshot statistics and combining the snapshot statistics with the immediately preceding statistics, the immediately preceding statistics being those obtained in a respective immediately preceding iterative update if any and being the first statistics otherwise.

27. A computer software product according to claim 26 wherein the computer readable instructions also provide a means for controlling the computer apparatus to implement an exponentially fading following window by weighting the immediately preceding statistics with a forget factor prior to combining the snapshot statistics with the immediately preceding statistics.

28. A method for dynamic blind signal separation including processing signals associated with pairs of windows of data, the method also including:
 a) an acquisition stage of processing a first leading window of data to obtain first results comprising a mean vector of signal samples, a covariance matrix of a data matrix of the first leading window, and a fourth order tensor obtained from a moment of signal vectors derived by decorrelation and normalisation of the data matrix; and
 b) a subsequent stage of processing following windows by iteratively updating immediately preceding results using subsequent data snapshots to produce snapshot results and combining the snapshot results with the immediately preceding results, the immediately preceding results being those obtained in a respective immediately preceding update if any and being the first results otherwise.

29. A method for dynamic blind signal separation including processing signals associated with pairs of windows of data, the method also including:
 a) an acquisition stage of processing a first leading window of data to obtain first results; and
 b) a subsequent stage of processing following windows by:
  i) iteratively updating immediately preceding results using subsequent data snapshots to produce snapshot results comprising a mean snapshot vector and a snapshot covariance matrix, a decorrelated and normalised snapshot equivalent providing signal vectors from which to obtain their moment as a fourth order tensor update, the immediately preceding results being those obtained in a respective immediately preceding update if any and being the first results otherwise;
  ii) weighting the snapshot results with a forget factor p and weighting the immediately preceding results with a further forget factor (1−p) to implement an exponentially fading window, where 0<p<1; and
  iii) combining the weighted snapshot results with the weighted immediately preceding results.

30. Computer apparatus for dynamic blind signal separation programmed to process signals associated with windows of data, wherein the computer apparatus is also programmed to implement:
 a) an acquisition stage of processing a first leading window of data to obtain first results comprising a mean vector of signal samples, a covariance matrix of a data matrix of the first leading window, and a fourth order tensor obtained from a moment of signal vectors derived by decorrelation and normalisation of the data matrix; and
 b) a subsequent stage of processing following windows by iteratively updating immediately preceding results using subsequent data snapshots to produce snapshot results and combining the snapshot results with the immediately preceding results, the immediately preceding results being those obtained in a respective immediately preceding update if any and being the first results otherwise.

31. Computer apparatus for dynamic blind signal separation programmed to process signals associated with windows of data, wherein the computer apparatus is also programmed to implement:
 a) an acquisition stage of processing a first leading window of data to obtain first results; and
 b) a subsequent stage of processing following windows by:
  i) iteratively updating immediately preceding results using subsequent data snapshots to produce snapshot results comprising a mean snapshot vector and a snapshot covariance matrix, a decorrelated and normalised snapshot equivalent providing signal vectors from which to obtain their moment as a fourth order tensor update, the immediately preceding results being those obtained in a respective immediately preceding update if any and being the first results otherwise;
  ii) weighting the snapshot results with a forget factor p and weighting the immediately preceding results with a further forget factor (1−p) to implement an exponentially fading window, where 0<p<1; and
  iii) combining the weighted snapshot results with the weighted immediately preceding results.

32. A computer software product comprising a computer readable medium containing computer readable instructions for controlling operation of computer apparatus to implement dynamic blind signal separation by processing signals associated with windows of data, wherein the computer readable instructions provide a means for controlling the computer apparatus to implement:
 a) an acquisition stage of processing a first leading window of data to obtain first results comprising a mean vector of signal samples, a covariance matrix of a data matrix of the first leading window in each case, and a fourth order tensor obtained from a moment of signal vectors derived by decorrelation and normalisation of the data matrix; and
 b) a subsequent stage of processing following windows by iteratively updating immediately preceding results using subsequent data snapshots to produce snapshot results and combining the snapshot results with the immediately preceding results, the immediately preceding results being those obtained in a respective immediately preceding update if any and being the first results otherwise.

33. A computer software product comprising a computer readable medium containing computer readable instructions for controlling operation of computer apparatus to implement dynamic blind signal separation by processing signals associated with windows of data, wherein the computer readable instructions provide a means for controlling the computer apparatus to implement:
 a) an acquisition stage of processing a first leading window of data to obtain first results; and
 b) a subsequent stage of processing following windows by:
  i) iteratively updating immediately preceding results using subsequent data snapshots to produce snapshot results comprising a mean snapshot vector and a snapshot covariance matrix, a decorrelated and normalised snapshot equivalent providing signal vectors from which to obtain their moment as a fourth order tensor update, the immediately preceding results being those obtained in a respective immediately preceding update if any and being the first results otherwise;
  ii) weighting the snapshot results with a forget factor p and weighting the immediately preceding results with a further forget factor (1−p) to implement an exponentially fading window, where 0<p<1; and
  iii) combining the weighted snapshot results with the weighted immediately preceding results.

* * * * *